(12) United States Patent
Ito et al.

(10) Patent No.: US 9,256,835 B2
(45) Date of Patent: Feb. 9, 2016

(54) INFORMATION PROCESSING APPARATUS ENABLING DISCRIMINATOR TO LEARN AND METHOD THEREOF

(75) Inventors: Yoshinori Ito, Tokyo (JP); Katsuhiko Mori, Kawasaki (JP); Takahisa Yamamoto, Kawasaki (JP); Osamu Nomura, Tokyo (JP); Masami Kato, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 431 days.

(21) Appl. No.: 12/683,982

(22) Filed: Jan. 7, 2010

(65) Prior Publication Data

US 2011/0010317 A1 Jan. 13, 2011

(30) Foreign Application Priority Data

Jan. 13, 2009 (JP) .................................. 2009-004975

(51) Int. Cl.
  *G06F 15/18* (2006.01)
  *G06N 99/00* (2010.01)
  *G06K 9/00* (2006.01)
  *G06K 9/62* (2006.01)

(52) U.S. Cl.
  CPC .......... *G06N 99/005* (2013.01); *G06K 9/00248* (2013.01); *G06K 9/6257* (2013.01)

(58) Field of Classification Search
  CPC .......... G06K 9/00523; G06K 9/00536; G06K 9/6267; G06K 9/00577; G06K 9/0061
  See application file for complete search history.

(56) References Cited

U.S. PATENT DOCUMENTS

| 5,819,247 A | 10/1998 | Freund |
| 2005/0102246 A1 | 5/2005 | Movellan |
| 2005/0213810 A1 | 9/2005 | Sabe |
| 2007/0086660 A1* | 4/2007 | Ai et al. ........................ 382/226 |

FOREIGN PATENT DOCUMENTS

| JP | 8-329031 A | 12/1996 |
| JP | 2004-185611 A | 7/2004 |
| JP | 2005-044330 A | 2/2005 |
| JP | 2005-284487 A | 10/2005 |

OTHER PUBLICATIONS

P. Viola, M. Jones, "Rapid Object Detection using a Boosted Cascade of Simple Features", Proc. IEEE Conf. on Computer Vision and Pattern Recognition, vol. 1, pp. 511-518, Dec. 2001.

(Continued)

*Primary Examiner* — Jeffrey A Gaffin
*Assistant Examiner* — Paulinho E Smith
(74) *Attorney, Agent, or Firm* — Canon USA, Inc. IP Division

(57) ABSTRACT

An information processing apparatus and method enables a pattern discriminator to learn. The apparatus establishes a branch structure appropriate for learning a discriminator having the branch structure without increasing processing time. The apparatus includes a preliminary learning unit to learn a preliminary discriminator for a respective one of a plurality of combinations of variations in variation categories in a discrimination target pattern. A branch structure determination unit is provided to perform discrimination processing using the preliminary discriminator and to determine a branch structure of a main discriminator based on a result of the discrimination processing. A main learning unit is included to learn the main discriminator based on the branch structure.

12 Claims, 19 Drawing Sheets

(56) References Cited

OTHER PUBLICATIONS

Z. Zhang, L. Zhu, S. Z. Li, and H. Zhang "Real-Time Multi-View Face Detection", Proceedings of the Fifth IEEE International Conference on Automatic Face and Gesture Recognition (FGR'02).

C. Huang, H. Ai, Y. Li, and S. Lao "Vector Boosting for Rotation Invariant Multi-View Face Detection", Tenth IEEE International Conference on Computer Vision (ICCV2005), vol. 1, Oct. 17-21, 2005, pp. 446-453.

* cited by examiner

TOTAL SUM

FIG.7
IN-PLANE ROTATION × DIVIDE INTO THREE
(i) 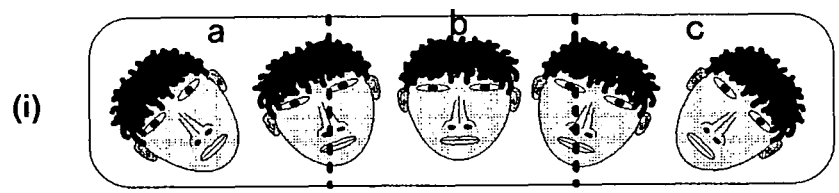
DEPTH ROTATION × DIVIDE INTO THREE
(ii) 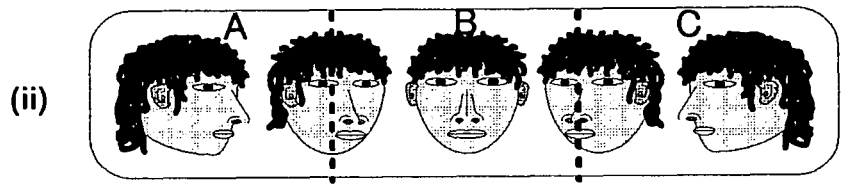
SIZE VARIATION × DIVIDE INTO TWO
(iii) 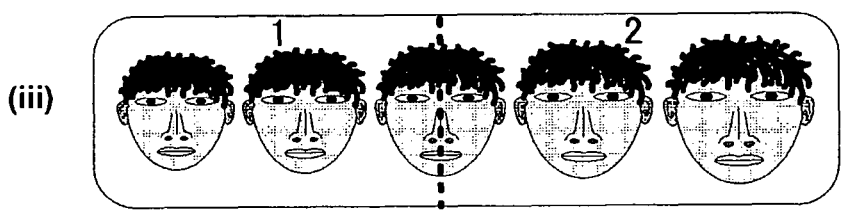

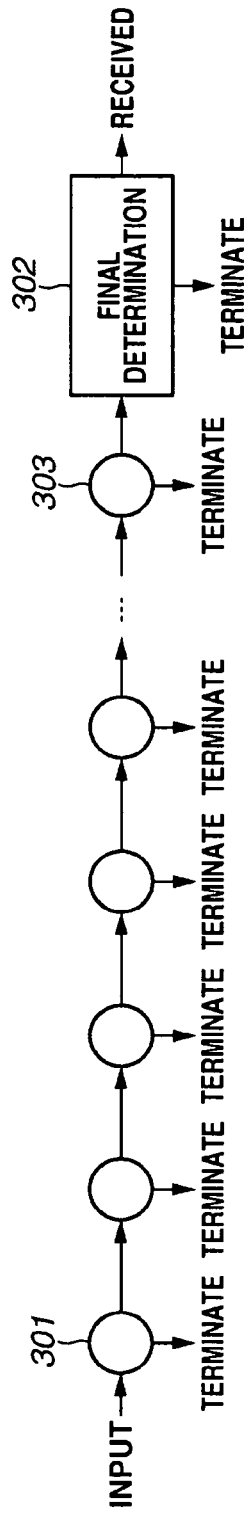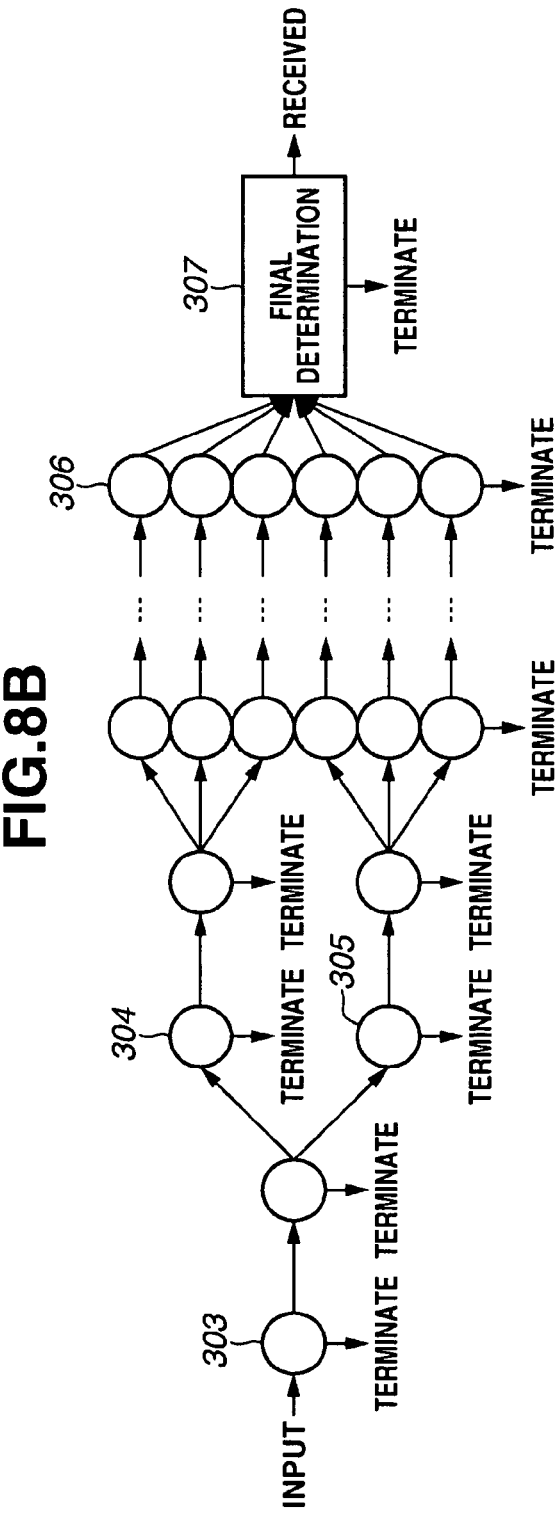

FIG.15

| PRELIMINARY DISCRIMINATOR LABEL | DATA CLASSIFICATION LABEL |||||||||||||||||||||
|---|---|---|---|---|---|---|---|---|---|---|---|---|---|---|---|---|---|---|---|---|
| | | aA1 | aA2 | aB1 | aB2 | aC1 | aC2 | bA1 | bA2 | bB1 | bB2 | bC1 | bC2 | cA1 | cA2 | cB1 | cB2 | cC1 | cC2 |
| aA1 | 0.02 | | | | | | | | | | | | | | | | | | |
| aA2 | 0.19 | 0.03 | | | | | | | | | | | | | | | | | | |
| aB1 | 0.07 | 0.18 | | | | | | | | | | | | | | | | | | |
| aB2 | 0.23 | | 0.08 | | | | | | | | | | | | | | | | | |
| aC1 | 0.11 | | | | | | | | | | | | | | | | | | | |
| aC2 | 0.28 | | | | | | | | | | | | | | | | | | | |
| bA1 | 0.37 | | | | | | | | | | | | | | | | | | | |
| bA2 | 0.5 | | | | | | | | | | | | | | | | | | | |
| bB1 | 0.42 | | | | | | | | | | | | | | | | | | | |
| bB2 | 0.54 | | | | | | | | | | | | | | | | | | | |
| bC1 | 0.46 | | | | | | | | | | | | | | | | | | | |
| bC2 | 0.58 | | | | | | | | | | | | | | | | | | | |
| cA1 | 0.68 | | | | | | | | | | | | | | | | | | | |
| cA2 | 0.83 | | | | | | | | | | | | | | | | | | | |
| cB1 | 0.72 | | | | | | | | | | | | | | | | | | | |
| cB2 | 0.87 | | | | | | | | | | | | | | | | | | | |
| cC1 | 0.77 | | | | | | | | | | | | | | | | | | | |
| cC2 | 0.92 | | | | | | | | | | | | | | | | | | | |

EXAMPLE: WHEN aA1 FLUCTUATION DATA IS INPUT

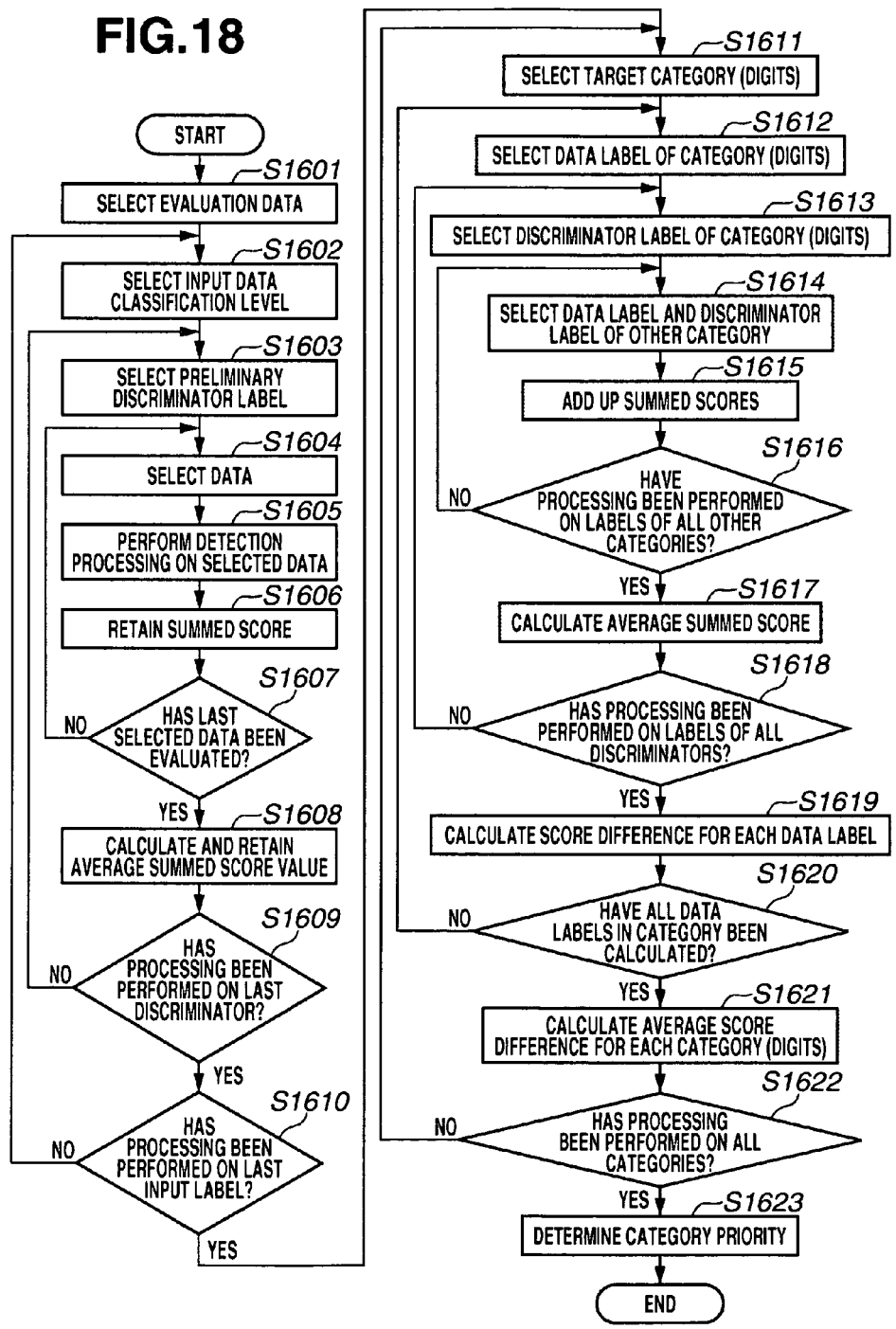

INFORMATION PROCESSING APPARATUS ENABLING DISCRIMINATOR TO LEARN AND METHOD THEREOF

BACKGROUND OF THE INVENTION

1. Field of the Invention

The present invention relates to an information processing apparatus enabling a pattern discriminator to learn and a method thereof.

2. Description of the Related Art

In recent years, in the field of pattern recognition, a method has drawn attention in which weak discriminators are cascade-connected to configure a pattern discriminator and to perform speedy detection processing on an object, such as a human face in an image. For example, in a method proposed by P. Viola and M. Jones, in "Rapid Object Detection using a Boosted Cascade of Simple Features", Proc. IEEE Conf. on Computer Vision and Pattern Recognition, Vol. 1, pp. 511-518, December 2001, firstly, a predetermined number of weak discriminators which extract a rectangular feature are cascade-connected to configure a strong discriminator referred to as a stage.

This weak discriminator is generated by a boosting learning algorithm (refer to Japanese Patent Application Laid-Open No. 8-329031). Further, the above-described method proposes a pattern discriminator having a structure in which a plurality of stages are cascade-connected. Since processing proceeds while performing termination determination processing (termination processing on a detection target position in the image) in each stage, which is the strong discriminator, a further operation is terminated to be performed at an early point on an input determined to be the non-detection target. Thus, processing can be performed at high speed as a whole. A method for discriminating a pattern will be described in detail below.

As illustrated in FIG. 1, the pattern discriminator described in the above-described literature enables a rectangular region 801 having a certain specified size (hereafter, referred to as a "processing window") to move within a face detection target image 800, which is a processing target, and to determine whether the processing window 801 includes a human face at each destination.

FIG. 2 illustrates a flow of face detection processing which is performed in the processing window 801 at each destination, as discussed in the above-described literature. The face detection processing in a certain processing window is performed in a plurality of stages. In each stage, weak discriminators having different combinations are allocated and cascade-connected to generate a strong discriminator.

Each weak discriminator detects a so-called Haar-like feature and includes a combination of rectangular filters. As illustrated in FIG. 2, each stage has a respective different number of weak discriminators. Each stage unit is configured by the cascade connection and performs the determination processing according to the order of connection. For example, in FIG. 2, a second stage follows a first stage for determination, and then a third stage follows the second stage therefor.

Each stage determines, according to an order assigned thereto, whether the processing window includes a human face by using the weak discriminator of the pattern assigned to each stage. In a certain stage, when it is determined that the processing window does not include a human face at a position, in following stages, the processing window does not perform the determination processing at that position (cascade processing is terminated). When the last determination processing determines that the processing window includes a human face, it is determined that the processing window includes a human face at this destination.

FIG. 3 is a flowchart illustrating an example of face detection processing. A flow of the face detection processing will be described more specifically with reference to FIG. 3.

In step S1001, in the face detection processing, the processing window 801, which is a processing target, is disposed on a face detection target image 800. Basically, as illustrated in FIG. 1, the processing window moves as scanning from an edge of the face detection target image 800 at a certain space in vertical and horizontal directions and selects a position to be processed. For example, the processing window is selected by raster scanning the face detection target image 800.

Subsequently, it is determined whether the processing window at the selected position includes a human face. The determination processing is performed using a plurality of stages as illustrated in FIG. 2. In step S1002, the stage for performing the determination processing is selected from the first stage in order.

In step S1003, the selected stage performs the determination processing. When it is determined in the selected stage that a summed score does not exceed a threshold value predetermined for each stage (NO in step S1004), then in step S1008, it is determined that the processing window does not include a human face, and the processing proceeds to step S1007 and following steps thereof. The processing in step S1007 and the following steps will be described below.

When the summed score exceeds the threshold value predetermined for each stage (YES in step S1004), it is determined whether the determination processing in step S1003 is performed in the last stage. When it is determined the determination processing in step S1003 is not performed in the last stage (NO in step S1005), the processing returns to S1002 and a following stage is selected to perform the determination processing by a newly selected stage. When it is determined that the determination processing in step S1003 is performed in the last stage (YES in step S1005), then in step S1006, it is finally determined that a current processing window includes a human face. At this point, this processing window is determined to include a human face.

Further, it is determined whether the processing window is the last processing window in the face detection target image. When the processing window is not determined to be the last processing window (NO in step S1007), the processing returns to step S1001, and the following processing window is selected to perform the processing of step S1002 and the following steps thereof. When the processing window is determined to be the last processing window, the face detection processing of the input image of the face detection target ends.

The processing of the determination for each stage will be described below.

The weak discriminators of one or more patterns are assigned for each stage. Boosting learning algorithm such as AdaBoost assigns the weak discriminator in leaning processing. Each stage determines whether the processing window includes a human face based on the weak discriminator of the pattern assigned to each stage.

In each stage, feature quantities are calculated in each of a plurality of rectangular regions in the processing window based on the weak discriminator having each pattern assigned to each stage. The feature quantity acquired herein is a total value or an average value of pixel values in each rectangular region, that is, a calculated value using a total value of the pixel values in the rectangular region. The total value in the rectangular region can be calculated at high speed by using summed area table information (referred to as "SAT" or "Integral Image") of the input image.

FIGS. 4A and 4B illustrate an example of SAT. FIG. 4A illustrates an original input image. An upper left point is defined as an origin (0, 0). When a pixel value of a coordinate position (x, y) in the input image (FIG. 4A) is defined as the pixel value I (x, y), an element C (x, y) of a position in the coordinate position (x, y) of SAT is defined by equation (1) as below.

$$C(x, y) = \sum_{\substack{x' \leq x \\ y' \leq y}} I(x', y') \qquad (1)$$

More specifically, as illustrated in FIG. 4B, a total value of the pixels in the rectangle having the pixels of the origin (0, 0) and the position (x, y) as the opposing corners in the input image (FIG. 4A) is the value C (x, y) of the position (x, y) in SAT (FIG. 4B). A sum of an arbitrary pixel value I (x, y) in the rectangular region in the input image (FIG. 4A) can be acquired only by referring to four points of SAT (FIG. 4B).

For example, as illustrated in FIG. 5, when a total sum C $(x_0, y_0 y_1)$ of the pixel values in the rectangular region having $(x_0, y_0)$ and $(x_1, y_1)$ as the opposing corners is acquired by using equation (2) as below.

$$C(x_0,y_0;x_1,y_1)=C(x_0-1,y_0-1)-C(x_0-1,y_1)-C(x_1,y_0-1)+C(x_1,y_1) \qquad (2)$$

A difference value as a relative value of the calculated feature quantity (for example, ratio and difference value, herein, the difference value of the feature quantities is assumed to be calculated) is calculated, and it is determined whether the processing window includes a human face based on the difference value. More specifically, it is determined whether the calculated difference value is larger or smaller than the threshold value set for the weak discriminator of the pattern which is used for determination. According to the determination results, it is determined whether the processing window includes a human face.

However, the determination at this point is obtained based on the weak discriminator of each pattern but not based on the stage. As described above, in each stage, the determination processing is performed separately based on each of all weak discriminators having the assigned pattern to obtain the determination results.

The summed score in the stage is calculated. A reliability weight (score) is separately assigned to each weak discriminator of the pattern. The reliability weight refers to "certainty of determination" for a sole weak discriminator, which is a fixed value indicating the sole reliability.

When it is determined that the processing window includes a human face, the score corresponding to the weak discriminator of the pattern used for the determination is referred to and added to the summed score of the stage. As described above, the total sum of added individual scores is calculated as the summed score in the stage.

More specifically, this summed score is a value indicating the certainty of the determination (reliability for the entire stage). When the reliability for the entire stage exceeds a predetermined threshold (threshold of the entire stage reliability), it is determined that the processing window possibly includes a human face in this stage, and the processing continues to proceed to the following stage. When the reliability for the entire stage in this stage does not exceed the threshold value, it is determined that the processing window does not include a human face, and the processing terminates the following cascade processing.

The above-described literature realizes the speedy pattern identification, which is typical detection of the face. A detection unit illustrated in FIGS. 2 and 3 can be used as a pattern discriminator for objects other than faces if only appropriate learning is previously performed.

Further, Japanese Patent Application Laid-Open Nos. 2004-185611 and 2005-44330 also discuss a technique relating to a method and an apparatus for discriminating the pattern based on an idea of the above-described literatures. The pattern discriminator having the structure in which the weak discriminators are cascade-connected in one line as described above can provide a sufficient and speedy identification ability when a pattern (detection target pattern) similar to a face is separated from other patterns (non-detection target patterns) in the image.

However, for example, when the detection target pattern is a face image, even if the face keeps facing front, if the face tilts some ten degrees right or left (in-plane rotation), the face cannot be "very similar" to an original upright front face. Additionally, if the face is rotated in an axial direction in which the front face changes to a side face (depth rotation or depth rotation in the horizontal direction), the face becomes a two-dimensional image pattern, which is different from the original face.

It is impossible to identify the largely changing pattern by cascade-connecting in one line. The cascade-connecting structure of the weak discriminators is used for gradually eliminating a non-detection target pattern which is not similar to the detection target pattern to be identified. Thus, the patterns to be identified need to be very similar to each other.

When only the in-plane rotation is performed, if the input image is input while being rotated sequentially, the discriminator detecting the front face that is nearly upright can identify the face at any angle of 360 degrees. However, this method increases a processing time according to an increasing number of rotations. When the depth rotation is added, the discriminator cannot perform the processing.

Z. Zhang, L. Zhu, S. Z. Li, and H. Zhang "Real-Time Multi-View Face Detection", Proceedings of the Fifth IEEE International Conference on Automatic Face and Gesture Recognition (FGR' 02), discusses a discriminator having a pyramid structure in a hierarchy state based on a Coarse to Fine strategy.

In this discriminator, in a first layer, a learning image pattern including all variations of a face direction to be detected is input to learn the stage. In a second layer, the variation of the face direction is divided into each predetermined range to learn a plurality of stages by the learning image patterns including the only divided variations.

In the following layer, the range is further divided into smaller ranges to learn the stages. As described above, as the layer is advanced, a strong discriminator (stage) having gradually decreased robustness is being constituted like a pyramid. This discriminator can only divide the variation of the face direction rotated by the depth rotation in the horizontal direction. The discriminator divides a ±90 degrees' range of the entire range by the depth rotation into three in the second layer and into nine in the third layer, but does not process the in-plane rotation.

When the detection processing is performed, if an input sub window passes the stage in the first layer, the stage in the second layer is sequentially performed. The sub window passes any one of the stages, and then proceeds to a following stage. As described above, the discriminator can detect the face patterns of all variations starting with a rough detection and performing gradually more accurate detections.

Japanese Patent Application Laid-Open No. 2005-284487 discusses a method for constituting the discriminator having a tree structure in which the detection units having the high robustness are gradually divided and a sub-window image is input into the detection unit having the lower robustness. This discriminator learns to process a part of the divided range of the variation which a parent node processes. The variation of the face direction in an exemplary embodiment of this method includes the depth rotation in the vertical direction in which the face moves up and down from a front position as well as the depth rotation in the horizontal direction.

After the detection processing of a first node including all depth rotations in the vertical and horizontal directions is performed, the variation of the face directions is divided into three, which are the front face and the two faces rotated right and left by the depth rotation. The faces are further divided in the vertical direction by the depth rotation in the following layer. Only the variation of the front face by the rotation in the vertical direction is divided in the following layer. The branch structure as described above is predetermined and a great number of pieces of sample data corresponding to each variation are input to learn the branches.

Unlike the literature by Zhang et al., the method discussed in Japanese Patent Application Laid-Open No. 2005-284487 does not need to perform an operation of the variation in a lower layer included in the variation in the terminated upper layer, and thus the speedy performance can be realized. The weak discriminator discussed in Japanese Patent Application Laid-Open No. 2005-284487 uses a pixel difference not the rectangular difference. However, Japanese Patent Application Laid-Open No. 2005-284487 and the literature by Zhang et al. share an idea that the weak discriminators constitute the strong discriminator by the cascade connection.

C. Huang, H. Ai, Y. Li, and S. Lao "Vector Boosting for Rotation Invariant Multi-View Face Detection", Tenth IEEE International Conference on Computer Vision (ICCV2005), Volume 1, 17-21 Oct. 2005, pp. 446-453, discusses another leaning method of the discriminator having a similar tree structure to that of Japanese Patent Application Laid-Open No. 2005-284487.

The variations that the discriminator described in the above literature can process are the in-plane rotation and the depth rotation in the horizontal direction. From the node including all variations in the first layer, the depth rotation in the horizontal direction is divided into five in two stages, and then each of the rotational variations is further divided into three in the fourth layer. According to this structure, the learning proceeds similarly to that in the above-described literature.

Unlike the above-described literature, an output of the discriminator of each node to be learnt before reaching the final branch is not a scholar value but a vector value of the number of elements corresponding to the number of branches of the layer right down the node. More specifically, each node detector before the branch is generated has a function for selecting the branch for the following layer as well as terminating a non-face image. When detection is performed, only the branch corresponding to an element having a vector value of each node of nearly one is started up. Thus, an unnecessary operation does not have to be performed, thereby ensuring the speedy performance.

The literatures by Zhang et al., Huang et al., and Japanese Patent Application Laid-Open No. 2005-284487 determine the method for dividing the range of the variation by the Coarse to Fine strategy or the tree structure. For example, in the literature by Zhang et al., only the variation by the depth rotation in the horizontal direction can be divided, but not the in-plane rotation.

Japanese Patent Application Laid-Open No. 2005-284487 discusses the variation by the depth rotation in both of the horizontal and vertical directions to determine the structure such that the variation in the horizontal direction is divided in the upper layers, and then the variation in the vertical direction is divided in the lower layers. The literature by Hueng et al. divides the variation by the in-plane rotation after the variation by the depth rotation in the horizontal direction is divided.

Since these branch structures are experimentally (or, intuitively) determined by a human who performs machinery learning processing, the branch structure is not necessarily constituted best to identify the pattern including the variation to be identified. For example, in the literature by Huang, et al. described above, if the variation by the depth rotation is divided after the variation by the in-plane rotation is divided, the identification performance may be improved or a processing speed may be improved, since a ratio for terminating the branch which does not include an input pattern in an early point.

After various branch structures are checked to select the most appropriate branch structure, the structure having the best detection performance may be adopted. However, the mechanical learning processing is generally very time consuming, it is not realistic to perform all-play-all processing.

SUMMARY OF THE INVENTION

The present invention is directed to an information processing apparatus capable of establishing a branch structure appropriate for leaning an discriminator having the branch structure without increasing processing time.

According to an aspect of the present invention, an information processing apparatus includes a preliminary learning unit configured to learn a preliminary discriminator for a respective one of a plurality of combinations of variations in variation categories in a discrimination target pattern, a branch structure determination unit configured to perform discrimination processing using the preliminary discriminator and to determine a branch structure of a main discriminator based on a result of the discrimination processing, and a main learning unit configured to learn the main discriminator based on the branch structure.

Further features and aspects of the present invention will become apparent from the following detailed description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 7 illustrates an example of a variation category of detection target data which a discriminator processes.

FIGS. 8A and 8B illustrate a connection structure of nodes of the discriminators generated by the information processing apparatus.

FIG. 15 illustrates termination ratios corresponding to combinations of data classification labels and a preliminary discriminator label.

FIG. 18 is a flowchart illustrating the preliminary discriminator evaluation processing according to a second exemplary embodiment of the present invention.

DESCRIPTION OF THE EMBODIMENTS

Various exemplary embodiments, features, and aspects of the invention will be described in detail below with reference to the drawings.

Figure 6:
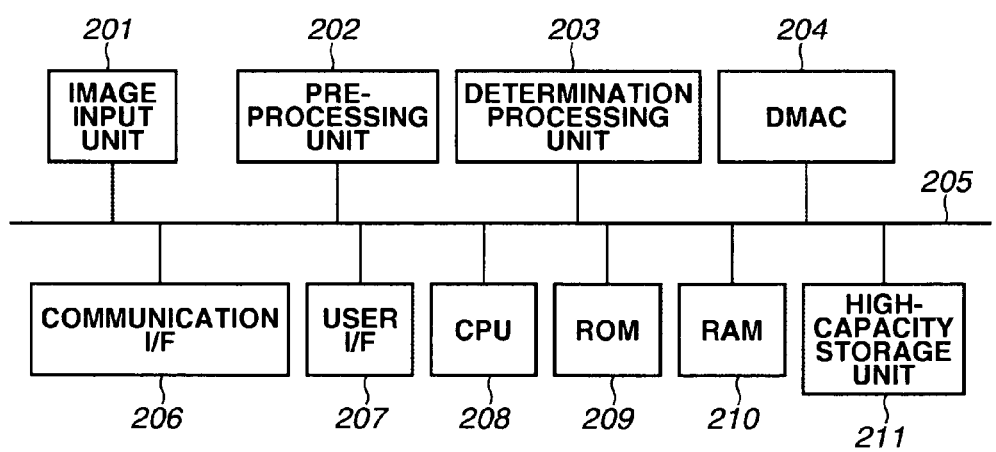
FIG. 6 is a block diagram illustrating a configuration of an information processing apparatus according to a first exemplary embodiment of the present invention.

FIG. 6 is a block diagram illustrating a configuration of an information processing apparatus according to a first exemplary embodiment of the present invention.

An image input unit 201 has a function for inputting, into the apparatus, image data which becomes a target of a pattern discrimination processing and image data of a learning sample. The image input unit 201 is a camera apparatus including an optical system, a photoelectric conversion device such a charge coupled devices (CCD) sensor, a driver circuit, an analog/digital (AD) converter, a signal processing circuit for correcting various images, and a frame buffer.

Alternatively, the image input unit 201 may be an interface (I/F) apparatus which shares a hardware with a communication interface unit (communication I/F) 206 as described below and receives image data from an external apparatus via a predetermined communication path, for example, a network connected to the I/F.

A pre-processing unit 202 performs various preliminary processing for effectively performing detection processing. More specifically, the pre-processing unit 202 performs by the hardware various image data conversions such as color conversion processing, contrast correction processing, and generation of summed area table (SAT) data. A discrimination processing unit 203 has a function for discriminating a predetermined object referring to an output of the pre-processing unit 202.

A discrimination processing unit 203 performs boosting discrimination processing based on a parameter generated by learning. Functions of the pre-processing unit 202 and the discrimination processing unit 203 (or a part of functions) may be mounted such that the processing is performed by a software program executed by a central processing unit (CPU) 208 described below.

A direct memory access controller (DMAC) 204 transmits data between each processing unit on a CPU bus 205 or between a random access memory (RAM) 210 and a read only memory (ROM) 209.

A communication interface unit 206 can transmit a command of a predetermined operation from the external apparatus to the information processing apparatus via the processing unit, or forward groups of data necessary for learning from the external apparatus to a high-capacity storage unit 211 described below.

A user interface unit (user I/F) 207 is an input/output device including, for example, a pressing button/switch for an operator to specify an operation of the apparatus or a display panel for displaying information to the operator.

The CPU 208 executes processing according to the present exemplary embodiment and controls operations of the units connected with each other via the bus 205 in the entire apparatus. The ROM 209 stores a command for regulating an operation of the CPU 208. The RAM 210 is used as a working memory necessary for the operation of the CPU 208. The RAM 210 includes a memory having a comparatively high capacity such as a dynamic RAM (DRAM). The high-capacity storage unit 211 is a high-capacity data storage apparatus such as a hard disk or a flash memory. For example, a high-capacity data set such as a sample image necessary for the learning is stored in the high-capacity storage unit 211.

The information processing apparatus has a configuration in which all devices are connected to the CPU bus 205. However, for example, the image input unit 201, the pre-processing unit 202, the discrimination processing unit 203, and the DMAC 204 may be connected to another bus (image bus). The image bus may be connected to the CPU bus via abridge. The buses are separated from each other as described above, which enables the hardware to operate the image input unit 201, the pre-processing unit 202, and the discrimination processing unit 203 in parallel with the CPU 208.

The information processing apparatus of the present exemplary embodiment will be described with reference to an example of learning a pattern discriminator having the branch structure (pattern discriminator of branch type) in which face images including combined variations of classified variations in three variation categories as illustrated in FIG. 7 are used as a detection target pattern.

A variation category (i) illustrates the variation of the in-plane rotation. A target variation range is defined from an upright face (center of the diagram) to each of faces rotated 45 degrees clockwise (defined as "+")/counterclockwise. According to the present exemplary embodiment, each of the ±45 degrees' ranges is divided into three, and "a" is labeled to a range of −45 degrees to −15 degrees, "b" is labeled to a range of −15 degrees to +15 degrees, and "c" is labeled to a range of +15 degrees to +45 degrees.

A variation category (ii) illustrates the variation of the depth rotation in the right and left directions. According to the present exemplary embodiment, a target variation range is from the front face to each of a right-side face and a left-side face, and the range is divided into three. "A" is labeled to a range from the right-side face to a face on which both eyes are just to appear (−90 degrees to −30 degrees), "B" is labeled to a range from a face on which the two eyes appear to another face on which the two eyes appear including the front face (−30 degrees to +30 degrees), and "C" is labeled to a range from the left-side face to a face on which both eyes are just to appear (+90 degrees to +30 degrees).

A variation category (iii) illustrates a size variation. According to the present exemplary embodiment, a size of the face is regulated by the number of pixels between the both eyes and a mouth in a vertical direction when the in-plane rotation is 0 degrees. A minimum face size is 16, and a maximum face size is 22. The size range is divided into two, and "1" is labeled to a small size and "2" is labeled to a large size. A face outside the range can be detected by channel processing in which the input image is enlarged or reduced.

According to the present exemplary embodiment, the face image in which the variations of the three categories are mixed is to be detected as the detection target. A variation by the depth rotation in a vertical direction may be added, the number of branches for each variation can be increased to improve detection accuracy. However, the descriptions will be omitted to avoid complexity.

Further, an overlap region may be provided for adjacent classifications of variation categories so that a pattern belonging to both classifications can exist. For example, in the variation category (i), "a" can be labeled to the range from −45 degrees to −12.5 degrees, "b" can be labeled to the range from −17.5 degrees to +17.5 degrees including the upright face, and "c" can be labeled to the range from +12.5 degrees to +45 degrees. In this case, for example, rotation data of +15.0 degrees is classified as "c" as well as "b" (copy the date if necessary).

Each divided branch of the preliminary discriminator or a main discriminator described below is a range in which each one classification of the above-described category is to be detected. When such a discriminator is learnt, the pattern corresponding to a boundary of the adjacent classifications is hardly missed by using the classification data in which the overlap region is provided, thereby improving robustness.

The detection processing by the discriminator of the information processing apparatus according to the present exemplary embodiment will be described below.

The pattern discriminator of the present exemplary embodiment includes the preliminary discriminator generated by preliminary learning processing (described below) and the main discriminator having the branch structure generated by main learning afterward (described below). Any detection processing is performed using the discrimination processing unit 203.

FIG. 8A illustrates a structure including one preliminary discriminator having no branch structure. In the preliminary learning processing, one discriminator having this structure described above is generated for each combination of all variation categories. A node 301 indicated by a circle illustrated in FIG. 8A is one of the weak discriminators. The discriminator of the present exemplary embodiment does not have a stage structure described in the above-mentioned-literature by P. Viola, et al. to provide a termination determination for each weak discriminator, but may have the stage structure too.

A threshold value processing unit (final determination unit) 302 performs threshold value processing (final determination) using a final determination threshold value on an input that has passed a final one of a predetermined number of the cascade-connected weak discriminators. When the input is accepted, the input is determined as a target object.

FIG. 8B illustrates an example of the main discriminator. This main discriminator has the branch structure in a tree shape. The processing is started at a weak discriminator 303 in a first stage, and divided into weak discriminators 304 and 305 at a third stage. In a fifth stage, each of the divided weak discriminators is further divided into three. The input which has not been terminated until a weak discriminator 306 in a final stage is finally determined at a final determination unit 307 that, if the input is accepted at the final determination unit 307, the input is determined as the target object.

In such a discriminator having the tree structure, there are some variations of methods for performing dividing processing.

A first method drives all branches. In this case, all outputs of the branches which can reach the weak discriminator 306 in the final stage without being terminated on the way are input to the final determination unit 307. The final determination unit 307 performs the threshold value processing after a predetermined integration processing is performed according to an output coordinate or a reliability level of determination of each branch, and determines whether to accept the output. An advantage of this method is that the classification can be performed with accuracy by the variation category simultaneously with the detection. A disadvantage is that the processing is time consuming.

A second method drives all search. In the case of FIG. 8B, for example, the detection processing is sequentially performed from the upper branch until the processing is terminated. When it is terminated, the processing returns to the branch right before being terminated and performs the node right therebelow (brother node). If there is a branch which has reached the final stage, and when the input is accepted by the final determination, the processing ends. When the input is not accepted, the processing returns to the branch right before the final stage. The advantage of this method is an improved speed for an easy mounting. The disadvantage is that the classification Cannot be performed with accuracy since the accuracy depends on an order of the branches.

A third method starts up branch selection. In this case, based on a processing result of the node on the way, which branch is to be started is selected. The advantage is high speed. The classification accuracy depends on a selection method. The disadvantage is that the processing becomes complicated. Therefore, it is necessary, for example, to generate the node which can be selected to be divided as described in the non-patent literature 3, or other branch selection method is mounted.

Any one of the starting methods may be used. Since the methods do not bother an essential quality of the exemplary embodiment, detailed descriptions will be omitted.

Figure 9:
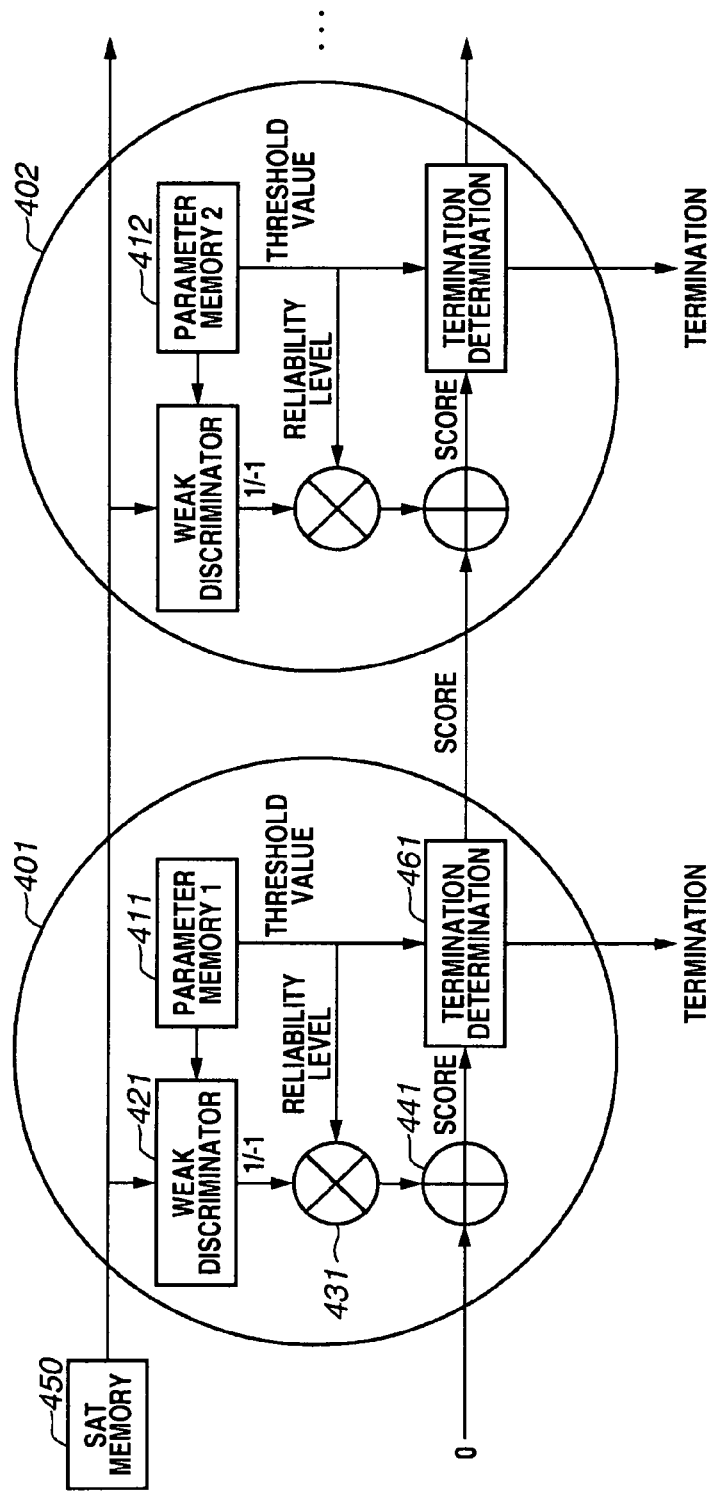
FIG. 9 illustrates the details of a weak discriminator mounted in a discrimination processing unit.

FIG. 9 illustrates the weak discriminator mounted in the discrimination processing unit 203. Each of blocks 401 and 402 represents a weak discriminator and a peripheral circuit thereof (the two in combination is referred to as a "node"). FIG. 9 illustrates a theoretical connection state, where many nodes (not illustrated) are connected in a cascade state, or divided on the way.

The node physically includes one processing circuit. A great number of nodes are theoretically realized by switching the parameter by time sharing. In order to realize high-speed processing, some or all of the nodes may be mounted as a physical circuit to perform the processing in parallel.

A parameter memory 411 stores parameter information for constituting the weak discriminator. The weak discriminator of the present exemplary embodiment uses a rectangular feature similar to that of the above-mentioned literature by P. Viola, et al. More specifically, the parameter memory 411 includes the number of rectangles, a rectangular coordinate, a filter coefficient, a filter threshold value, a reliability level weight (score), and a discrimination threshold value.

These parameters are actually stored in a memory block region in the discrimination processing unit 203, and the parameter corresponding to the desired weak discriminator is read by an address decoder. The parameter memory 411 indicates to have read a parameter set 1 corresponding to a weak discriminator 1, and a parameter memory 412 indicates to have read a parameter set 2 corresponding to a weak discriminator 2.

Figure 1:
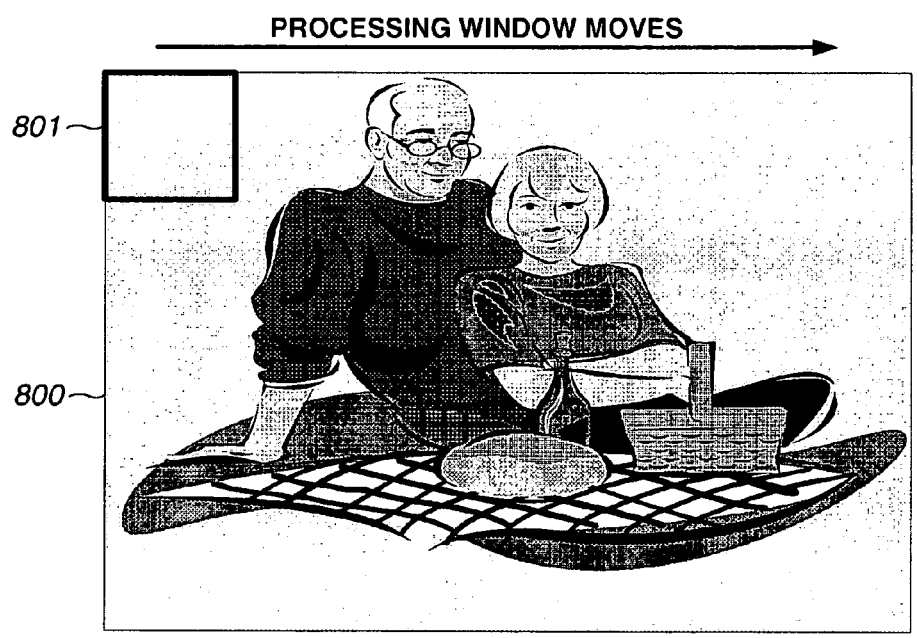
FIG. 1 illustrates an example of face detection processing.
Figure 2:
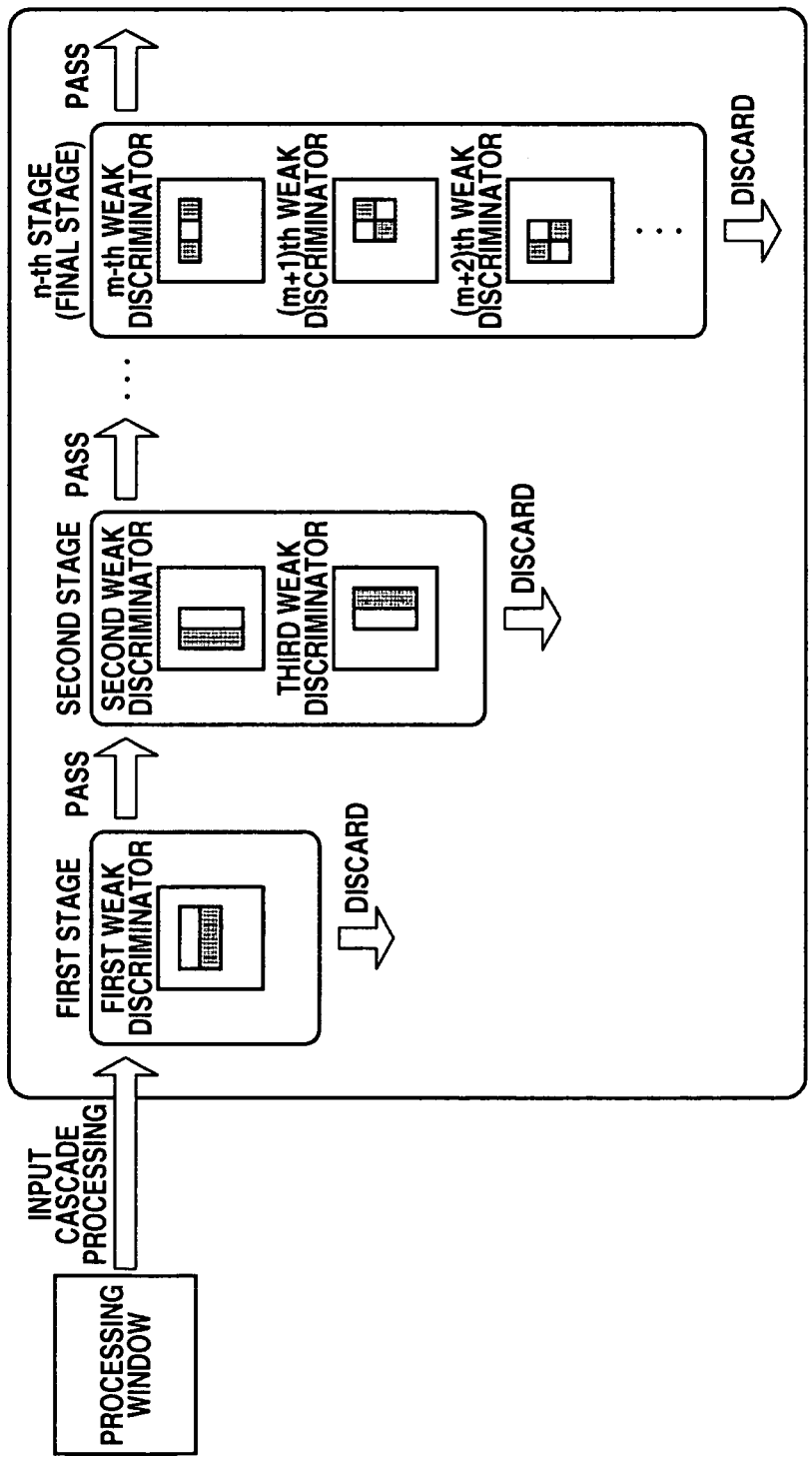
FIG. 2 illustrates a flow of the face detection processing in a processing window at each destination position.
Figure 3:
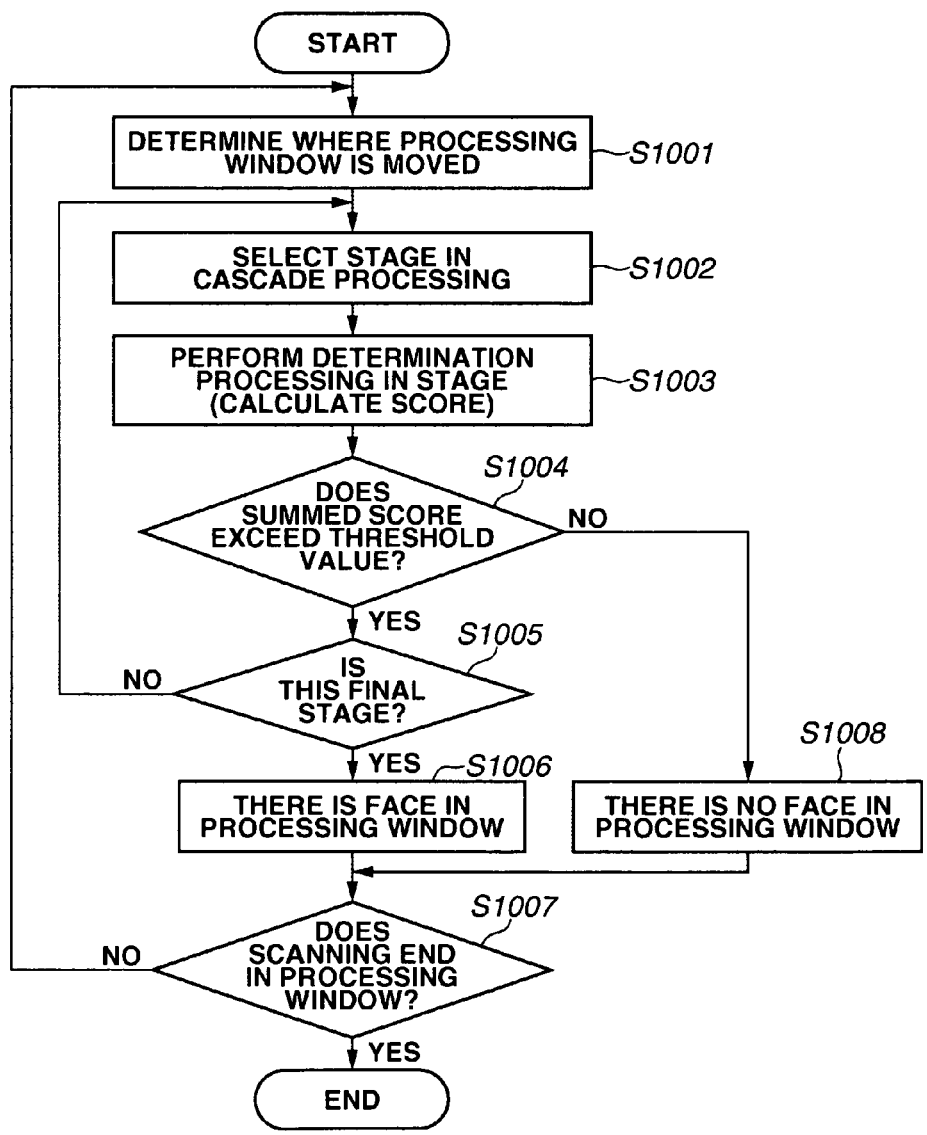
FIG. 3 is a flowchart illustrating an example of face detection processing.
Figure 4A:
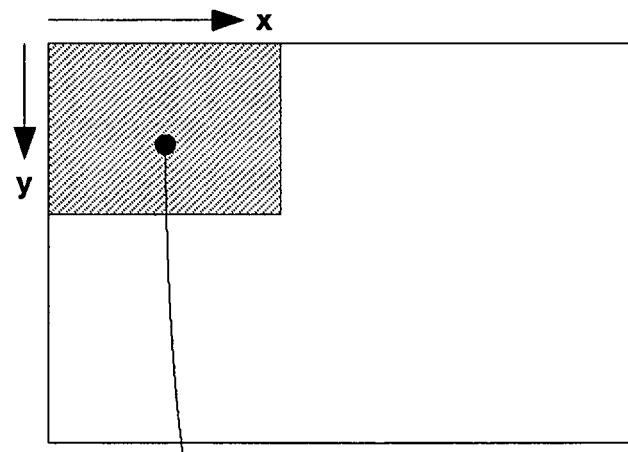
FIGS. 4A and 4B illustrate an example of SAT.
Figure 4B:
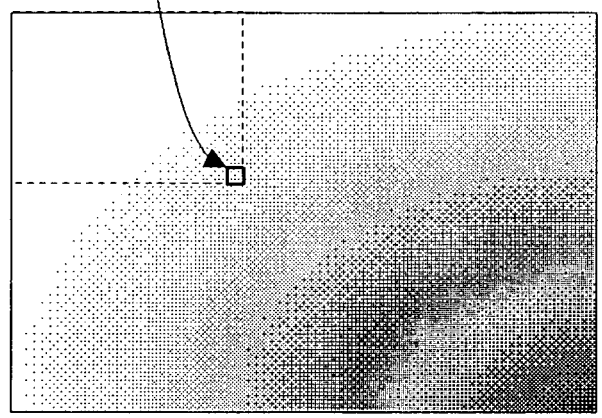
Figure 5:
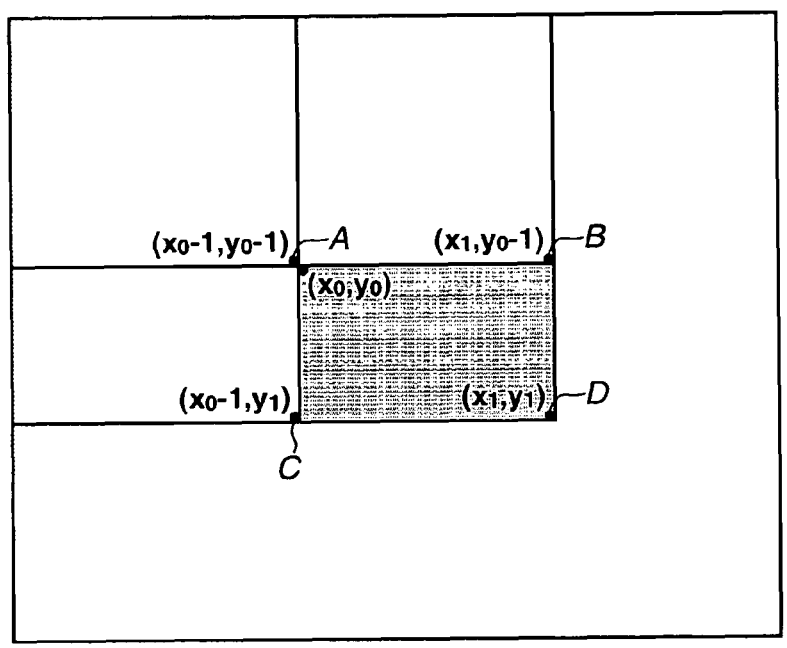
FIG. 5 illustrates a method for calculating a total value of a rectangular region by the SAT.

The number of rectangles is information for specifying the number of the rectangles in a detection window. For example, when a filter such as the weak discriminators in the first and second stages as illustrated in FIG. 2, the number of the rectangles is two. Further, in the case of the m-th weak discriminator in the n-th stage in FIG. 2, the number of rectangles is three. In FIG. 2, each of a white rectangle and a black rectangle indicates one rectangle.

A summed value (or average value) of pixel values in each rectangle is by multiplied a by a "filter coefficient" set for each rectangle. The multiplied values are summed up, and a weak discriminator 421 performs the threshold processing on the summed value by using the "filter threshold value". When the threshold value condition (i.e., equation (3)) is satisfied, the weak discriminator 421 outputs "1", and when not satisfied, the weak discriminator 421 outputs "−1".

$$\sum_{i}^{p} S_i C_i > W_{Th\_i} \quad (3)$$

The number of rectangular regions is represented by "p". A sum of the pixel values in the rectangular region is represented by "$S_i$". The filter coefficient for each rectangular region is represented by "$C_i$". The filter threshold value (discrimination threshold value) of the weak discriminator of a node "t" is represented by "$W_{Th\_t}$".

A shape, a position, and a number of the rectangular region, the filter coefficient "$C_i$", and the filter threshold value "$W_{Th\_t}$" are the parameters determined when the learning is performed. In the weak discriminator of the present exemplary embodiment, the coefficient "$C_i$" has always either of the values "1" or "−1". More specifically, the left-hand side of equation (3) is equivalent to processing for acquiring a difference value of the total value of the pixel values "$S_i$" among a plurality of rectangular regions. When the difference value is larger than a predetermined filter threshold value (discrimination threshold value) "$W_{Th\_t}$", it is determined that the input data is the discrimination target pattern as long as the weak discriminator determines.

As described above, the total value in the rectangular region can be calculated at extremely high speed by referring to the SAT data. A SAT memory 450 stores the SAT data for a piece of input image data calculated by the pre-processing unit 202 before the detection processing is started. The weak discriminator 421 calculates the total value of the pixel values "$S_i$" from the SAT memory 450 to determine equation (3) referring to a value of the position of the detection window.

The "rectangular coordinate" is coordinate information which represents each position of the rectangular region. The "filter coefficient" is a positive or negative coefficient. The "reliability level weight (score)" is a value representing the reliability level of a weak discriminator alone of the target node. The boosting discrimination discriminates using a total value (summed score) having a reference symbol of the score for each node which has been processed before the t-th node.

The summed score referred to herein is a value representing certainty of the discrimination of all discriminators which are cascade-connected from the first node to the t-th node, more specifically, a reliability level of all of the discriminators. The "discrimination threshold value" determines the boosting discriminator by using the summed score value.

When it is defined that a determination result of the weak discriminator 421 of the node in the k-th stage of the cascade connection is "$h_k$" (x) (x: input data), the reliability label is "$\alpha_k$", the discrimination threshold value of the node in the t-th stage is "$T_{gh\_t}$", the termination determination by a termination determination unit 461 in the t-th stage is expressed by equation (4). When the weak discriminator determines that the input data is the detection target object (when the filter threshold value condition of equation (3) is satisfied), the determination result $h_k(x)$ indicates "1". When it is determined that the input data is not the detection target object (when the filter threshold value condition of equation (3) is not satisfied), the determination result $h_k(x)$ indicates "−1".

$$\sum_{k=1}^{t} \alpha_k h_k(x) > T_{gh\_i} \quad (4)$$

When equation (4) is satisfied, the processing is continued, and the summed score (entire reliability level) is output to a following node. When the discrimination condition is satisfied at the final node, the input data is determined to be the detection target pattern. When the preliminary discriminator having no branch structure is used, the final determination processing corresponds to the final determination performed by the final determination unit 302 illustrated in FIG. 8A. The reliability level "$\alpha_k$" and the discrimination threshold value "$T_{gh\_t}$" are the parameters which are determined when the node in the t-th stage is learnt.

The reliability level "$\alpha_k$" is read from the parameter memories 411 and 412 corresponding to the node, multiplied by the output $h_k(x)$ of the weak discriminator 421 by a multiplier 431, and added to the summed score output from the node at a previous stage by an adder 441. The termination determination unit 461 determines equation (4) for the summed score $$\sum_{k=1}^{t} \alpha_k h_k(x)$$

by using the discrimination threshold value "$T_{gh\_t}$" read from the parameter memory 411.

When the summed score is discrimination threshold value "$T_{gh\_t}$" or more, the processing is continued and the summed score is output to the node at the following stage. When the branch structure is used, the same summed score value is output to all divided brother nodes.

The final determination units 302 and 307 illustrated in FIGS. 8A and 8B perform the threshold value processing on the summed score (after the necessary integration processing is performed for the branch structure) by using the final determination threshold value. Particularly, for the final node 303 in the non-branch structure, the termination determination unit 461 illustrated in FIG. 9 is not needed, and the summed score output from an adder 341 is directly input to the final determination unit 302 and used for determination. At this point, the determination threshold value of the termination determination unit 461 is set to a sufficiently-small negative value.

Alternatively, a path for outputting the summed score without passing through the termination determination unit 461 may be provided by using a selector (not illustrated), when the branch structure is used. Further, only the data remaining after the termination processing is performed by the weak discriminator 306 in the final stage may be used for the integration or final determination processing. For the both processing described above, the common node processing circuit can be used. By the above-described processing, the boosting determination processing is performed.

Figure 10:
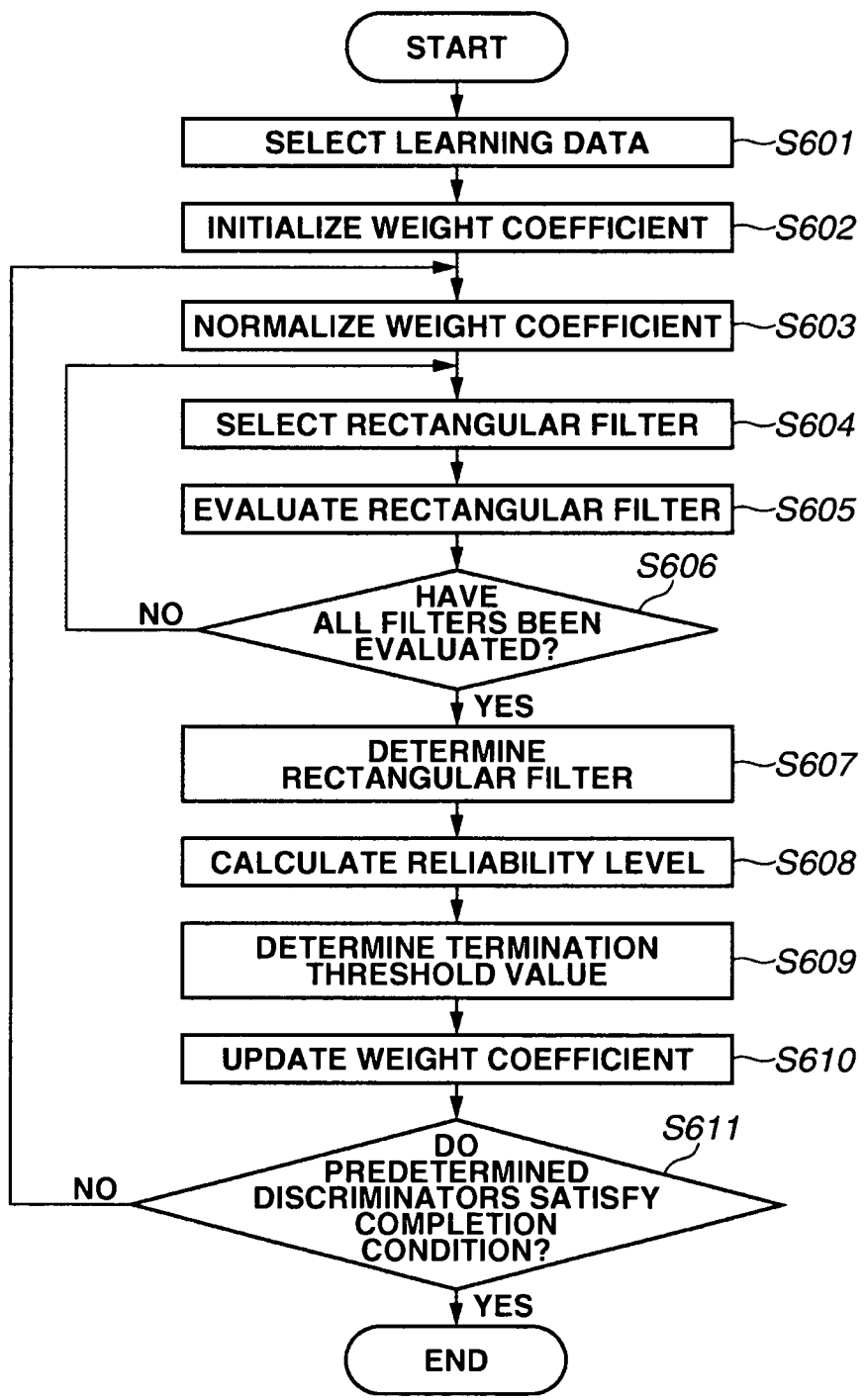
FIG. 10 is a flowchart illustrating an example of processing for mechanically learning a boosting discriminator constituted by a plurality of the weak discriminators.

The learning processing of the information processing apparatus will be described below with reference to FIG. 10. FIG. 10 is a flowchart illustrating an example of processing for mechanically learning a boosting discriminator including a plurality of the weak discriminators. The processing described below is performed by the CPU 208 illustrated in FIG. 6.

A boosting discriminator referred to herein is one of the preliminary discriminators described above, and corresponds to one of the branches in the main discriminator having the branch structure. As described above, the preliminary discriminator performs the discrimination processing step by step. When the preliminary discriminator determines that the input data is not the discrimination target pattern, the preliminary discriminator performs the termination of the processing of the following stages.

Figure 11:
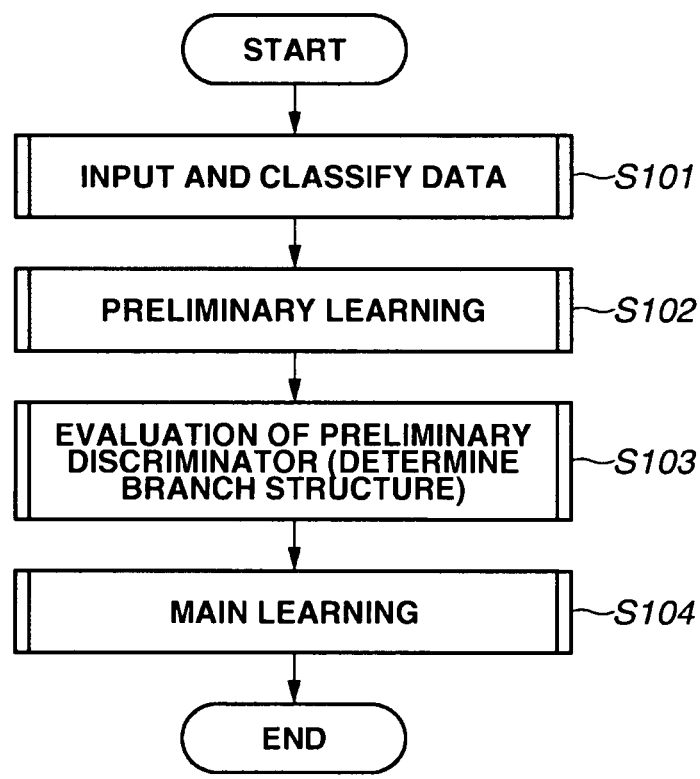
FIG. 11 is a flowchart illustrating a flow of entire learning processing.

The process in step S101 as illustrated in FIG. 11 will be described below. Prior to the learning processing, the groups of data necessary for the learning are classified according to the category and stored in the high-capacity storage unit 211. A great number of pieces of detection target data belonging to the classification range to be processed by the boosting discriminator and a great number of pieces of non-detection target data such as a background to be learnt are used for the learning processing.

For example, in learning the preliminary discriminator or one branch in the main discriminator which process the label aB1 illustrated in FIG. 7, all of or a part of the face image data which is retained in the high-capacity storage unit 211 and classified as the label aB1 is used as the detection target data.

The weak discriminator is learnt according to the Ada-Boost algorithm. A method of a basic learning algorithm is the same as that described in the literature by Viola, et al.

In step S601, the CPU 208 selects the data to be used from among the learning data retained in the high-capacity storage unit 211. The CPU 208 prepares face data which is the detection target pattern and non-face data which is the non-detection target pattern at a predetermined ratio.

When the branch is generated in the preliminary discriminator or the branch of the main discriminator, classification according to the combination of the variation categories to be processed is used to select the face data belonging to each classification as the detection target pattern. The non-face data is used as the non-detection target pattern. Further, it is also possible to add and learn the face pattern which is classified according to the combination of the variation categories in which the non-detection target pattern is not processed. With this learning method as described above, each preliminary discriminator or the branch of the main discriminator can be expected to perform the detection processing having improved selection quality.

In step S602, the CPU 208 initializes a weight coefficient relative to the prepared learning data set. When a total amount of the learning data is "m", all the weight coefficient "$W_{t,i}$" (t: node number, i: learning data number) is initialized by the following equation (5).

$$w_{1,i} = \frac{1}{m}, i = 1, \ldots, m \tag{5}$$

More specifically, when the first node is learnt, a common weight is given to all of the learning data. In steps S603, 604, 605, 606, 607, 608, 609, and 610, the CPU 208 learns one weak discriminator. In step S603, the CPU 208 performs processing for normalizing the weight coefficient according to equation (6).

$$w_{t,i} \leftarrow \frac{w_{t,i}}{\sum_{j=1}^{m} w_{t,j}} \tag{6}$$

When the processing first proceeds to step S603, the weight coefficient "$W_{1,i}$" has a value set in step S602 (equation (5)). Thus, equation (6) is already satisfied. In step S603, when the weight coefficient "$W_{t,i}$" is changed after the second node, the weight coefficient is normalized such that the total sum becomes "1".

In step S604, the CPU 208 selects one rectangular filter from among groups of rectangular filters. The groups of the rectangular filters are a plurality of candidates of rectangular filters having variable forms according to the size or position in the detection window with respect to a basic regular filter having a predetermined shape.

For example, when a difference filter between an upper and lower adjacent rectangular regions illustrated in the first weak discriminator in FIG. 2 is used, a plurality of variations can be applied to the difference filter according to a size, a ratio of height and width of the rectangular region, and a position in the detection window. With reference to some predetermined basic rectangular filters, all combinations of the rectangular filters including the variations described above are prepared as the groups of the rectangular filters. The prepared rectangular filters are numbered serially, and the given number is also used as a filter number. In step S604, the CPU 208 performs processing for selecting the prepared candidate of the rectangular filter one by one.

In step S605, the CPU 208 uses a selected rectangular filter candidate to evaluate a discrimination ability of the rectangular filter for all of learning data.

The CPU 208 calculates an output value of the rectangular filter for all of learning data and determines the threshold value for separating the detection target from the non-detection target. At this point, the CPU 208 calculates the filter output value in the hardware by using the discrimination processing unit 203. Further, the CPU 208 determines the threshold value by using a histogram of the rectangular filter output value.

Figure 12:
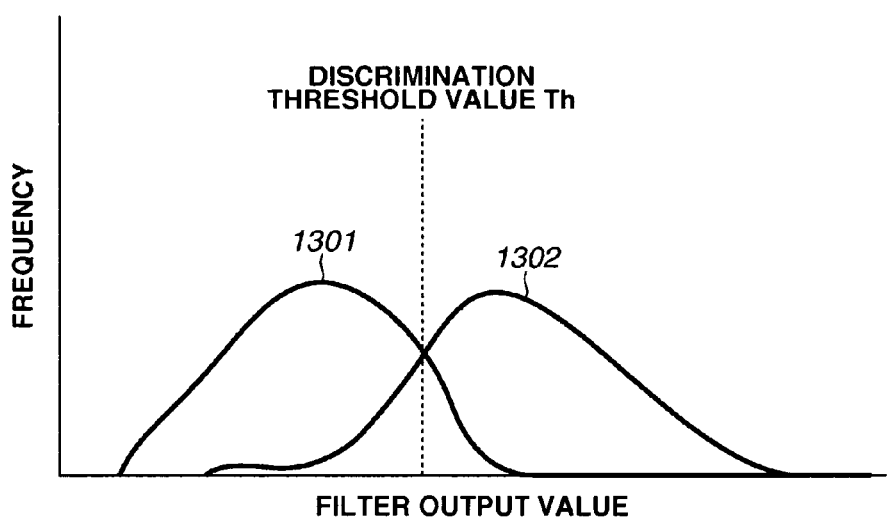
FIG. 12 illustrating a histogram of detection target data and that of non-detection target data with respect to entire learning data.

FIG. 12 illustrates a histogram 1302 of the detection target data and a histogram 1301 of the non-detection target data for all of learning data. The horizontal axis indicates a filter output value (rectangular difference value), and the vertical axis indicates an amount of learning data of the filter output value. The CPU 208 determines the threshold value "$F_{Th\_t,j}$" which can maximally separate the detection target from the non-detection target by using the histogram (minimum error ratio, t: node number to be learnt, j: filter candidate number).

Further, in step S605, the CPU 208 calculates the detection error ratio relative to all of the learning data by using the determined threshold value "$F_{Th\_t,j}$". Equation (7) expresses the error ratio having a weight relative to all of the learning data.

$$E_{t,j} = \Sigma_i w_{t,i} |h_{t,j}(x_i) - y_i| \tag{7}$$

Equation (7) includes a node number to be learnt "t", a filter candidate number "j", and a learning data number "i".

In equation (7), a determination output "$h_{t,j}$" ($x_i$) of the learning data "i" is determined by using the rectangular filter candidate "j". When the input target data "$x_i$" is determined to be the detection target by using the threshold value "$F_{Th\_t,j}$", "1" is output, and when the input target data does not include the detection data, "0" is output.

For a correct answer label (teaching label) "$y_i$", either one of "1" and "0" is assigned depending on whether the input learning data "i" is the detection target. By the repetition processing in step S606 (NO in step S606), the CPU 208 performs the above-described processing in steps S604 and S605 on all of the rectangular filter candidates to acquire an error ratio having a weight "$E_{\_t,j}$".

When calculation of all of the error ratios having a weight "$E_{\_t,j}$" is completed (YES in step S606), the CPU 208 finds a rectangular filter candidate "j" having the smallest error ratio having a weight "$E_{\_t,j}$" (i.e., rectangular having the highest discrimination performance). In step S607, the CPU 208 selects the acquired rectangular filter candidate as the weak discriminator. The error ratio having a weight is defined as "$E_{Th\_t,j}$". The threshold value "$F_{Th\_t,j}$" used for this filter is defined as the filter threshold value "$W_{Th\_t}$"

In step S608, the CPU 208 calculates the reliability level "$\alpha_t$" of the weak discriminator by using equation (8).

$$\alpha_t = \log\left(\frac{1 - E_i}{E_i}\right) \tag{8}$$

The CPU 208 stores in the RAM 210 the calculated reliability "$\alpha_t$", the filter threshold value "$W_{Th\_t}$", and the shape, the position, the filter coefficient and the number of rectangular regions of the rectangular filter as the parameters of the node "t" to be learnt.

In step S609, the CPU 208 determines the termination threshold value. Similarly to the method for determining the determination threshold value of the rectangular filter, the CPU 208 can determine the threshold value from the histogram of the summed score relative to the detection target data and the histogram of the summed score relative to the non-detection target data.

Figure 13:
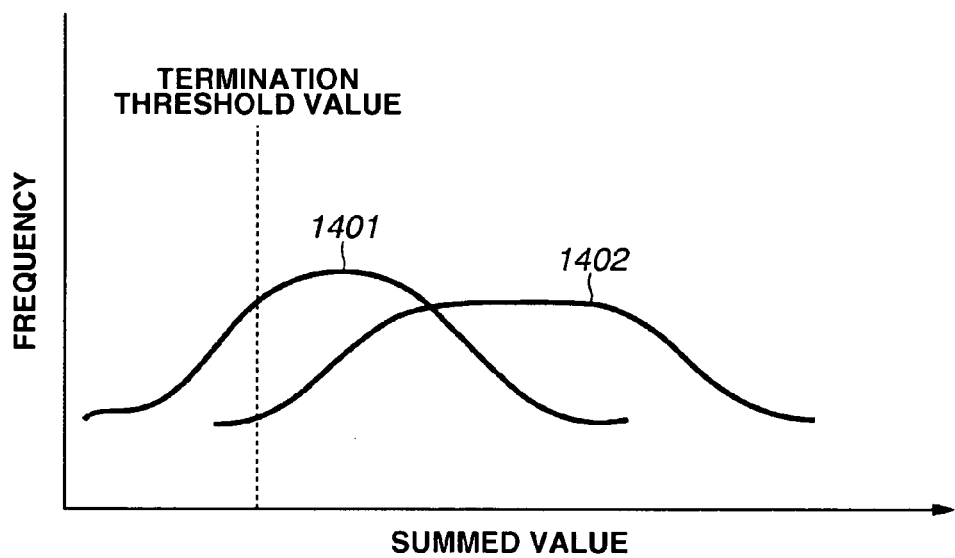
FIG. 13 schematically illustrates an example of a histogram of summed scores for illustrating a method for determining a termination threshold value.

FIG. 13 schematically illustrates an example of the histogram of the summed score for illustrating a method for determining the termination threshold value. A histogram 1401 indicates the summed score relative to the non-detection target data, and a histogram 1402 indicates the summed score relative to the detection target data. The CPU 208 determines the termination threshold value such that a termination ratio relative to the detection target data (the number of terminations of detection target data groups/the number of detection target data groups) is within an allowable region which is a predetermined value or less.

The number of terminations of the detection target data refers to a total number of the data groups in which the summed score of the histogram 1402 is the threshold value or less determined in the present exemplary embodiment. Since the more the non-detection target data are terminated, the better the processing is performed, the non-detection target data does not need to be considered. The determined threshold value is the termination threshold value parameter "$T_{gh\_t}$" to be used at the termination determination unit 461 illustrated in FIG. 9.

In step S610, the CPU 208 updates the weight coefficient relative to each learning data by using the following equation (9).

$$w_{t+1,i} = w_{t,i} \times \left(\frac{E_t}{1 - E_t}\right) \tag{9}$$

However, the weight coefficient "$W_{t,i}$" updated by equation (9) is only the coefficient of the learning data "i" which can be correctly detected. In other words, the weight of the learning data (both detection target data and non-detection target data) which can be correctly detected is updated to become smaller. Therefore, in step S610, the weight relative to the learning data which is not correctly detected is relatively increased.

After one weak discriminator is generated by the processing described above (in steps S603, S604, S605, S606, S607, S608, S609, and S610), then in step S611, the CPU 208 determines whether the boosting discriminator which satisfies a predetermined completion condition is generated.

The predetermined condition is satisfied when the number of weak discriminators reaches a predetermined maximum number, or when the error ratio $E_j$ having a weight calculated by equation (7) is less than a predetermined value and a desired performance when the learning is started can be achieved (YES in step S611). When the condition is not satisfied (NO in step S611), the CPU 208 returns the processing to step S603 to continue the generation processing of the following weak discriminator.

FIG. 11 illustrates a flow of the entire learning processing performed by the information processing apparatus of the present exemplary embodiment. FIG. 11 is a flowchart illustrating the flow of the entire learning processing.

In step S101, sample data is input and classification processing is performed. In step S101, image data of a detection target object to be used for the learning (face image data in the present exemplary embodiment) and the image data of a detection target object used for evaluation of the preliminary discriminator described below are input to the apparatus. A sufficient amount of data including all variations in each category is necessary. The learning data and the evaluation data may be separately input. Alternatively, a large amount of face image data groups may be input and then sampled when the learning and the evaluation are performed.

Further, the image data of the non-detection target object including an object which is not the detection target object and the background (non-face data in the present exemplary embodiment) are input to the apparatus in step S101 and can be used for the learning and the evaluation in following steps.

The data described above is input via the image input unit 201 illustrated in FIG. 6. When the image input unit 201 is composed of the camera apparatus, a user can input necessary additional information (position coordinate of eyes or mouth) to the face image captured by shooting via the ser I/F 207 to store the data.

Alternatively, the data can be input together with information additionally having the face image previously collected from the external apparatus via the communication I/F 206 which is shared with the image input unit 201. The input learning data and the evaluation data are retained in the high-capacity storage unit 211.

The input and retained face image data are classified (labeled) in all of the variation categories which the discriminator processes by using the additional information. For example, "a face of size 18 on which the in-plane rotation is implemented 30 degrees counterclockwise and the depth rotation is implemented 10 degrees to the left" is classified as a label "aB1" as illustrated in FIG. 7.

According to the present exemplary embodiment, the face data additionally includes three types of information about coordinates of both eyes, a coordinate of a mouth, and an angle of the depth rotation. When the information is input via the user I/F 207, a pointing device such as a mouse is used to indicate the coordinates of the eyes and the mouth on the face image displayed on a display. Further, an angle of the depth rotation (subjective) is input via a keyboard. When the learning data and the evaluation data are transmitted from the external apparatus, the additional information which has been already input is also transmitted.

According to the present exemplary embodiment, the angle of the in-plane rotation in the category (i) can be calculated from an angle of a line segment connecting the both eyes. When this line segment is level off in the image, it is defined that the face image is rotated zero degrees by the in-plane rotation. When this state is determined as a reference, a clockwise rotation is defined as "+". Further, the size variation in the category (iii) is calculated by the number of pixels of a difference between heights of the line segment connecting the both eyes and a mouth position.

When only one eye can be seen on the side face, a direction of a top head indicating right above the head is separately input as the additional information. The in-plane rotation and the size of the face image can be calculated by using this information. The additional information indicating a point of the feature such as a tail and an inner corner of an eye, a year, and a nostril may be increased to estimate and calculate the direction of the top head.

The input and classification processing in step S101 may be performed at any time before starting the learning. When the different kind of data is used each for the following learning and evaluation steps, the input and classification processing may be completed by the start of each step and retained in the high-capacity storage unit 211. Alternatively, in the following learning and evaluation steps, classified data stored in the external apparatus may be sequentially obtained via the communication I/F 206.

In step S102, the preliminary discriminator is preliminary learnt. The preliminary discriminator is a cascade-connected discriminator having no branches, as illustrated in FIG. 8A. One preliminary discriminator is generated for each of all combinations of the variation categories. When the in-plane rotation (i) is divided into three, the depth rotation is divided into three, and the size variation (iii) is divided into two according to the present exemplary embodiment, the preliminary discriminators of 3×3×2=18 are generated.

The preliminary learning processing is performed as an operation by the CPU 208 according to the learning processing algorithm as described above. The detection target data of each preliminary discriminator is the face data classified according to the combination of variation categories to be processed by the discriminator. For example, the preliminary discriminator which processes the classification indicated by the label "aB1" as illustrated in FIG. 7 inputs only the face image having the same label as the detection target data.

Further, the non-face data of the non-detection target is common for any of the preliminary discriminators. It is also possible to add to the non-detection data the face data belonging to the variation category which the learning preliminary discriminator does not process in order to perform the learning. If this method is adopted, the quality of selecting the detection target can be improved. On the other hand, since robustness can be decreased, whether to adopt the method needs to be carefully determined.

The length of the preliminary discriminator (the number of connected stages of the weak discriminator) generated in the present exemplary embodiment is very short compared to the main discriminator having some hundreds of stages or more. To previously set a predetermined number of stages, which are about ten stages to some ten stages, before starting the learning, or to satisfy a condition enabling the evaluation processing to be performed described below can be set as a discrimination condition for completing the learning.

In step S103, the CPU 208 evaluates the generated preliminary discriminator and determines an order of the categories to be branched. In this processing, the evaluation data belonging to a certain combination of variation categories is input to the preliminary discriminator, and a priority order of the categories based on the detection processing result (discrimination processing result) is determined. According to the present exemplary embodiment, as one example of methods for determining the priority order based on the detection processing result, a method which uses a termination ratio of the evaluation data is discussed.

Figure 14:
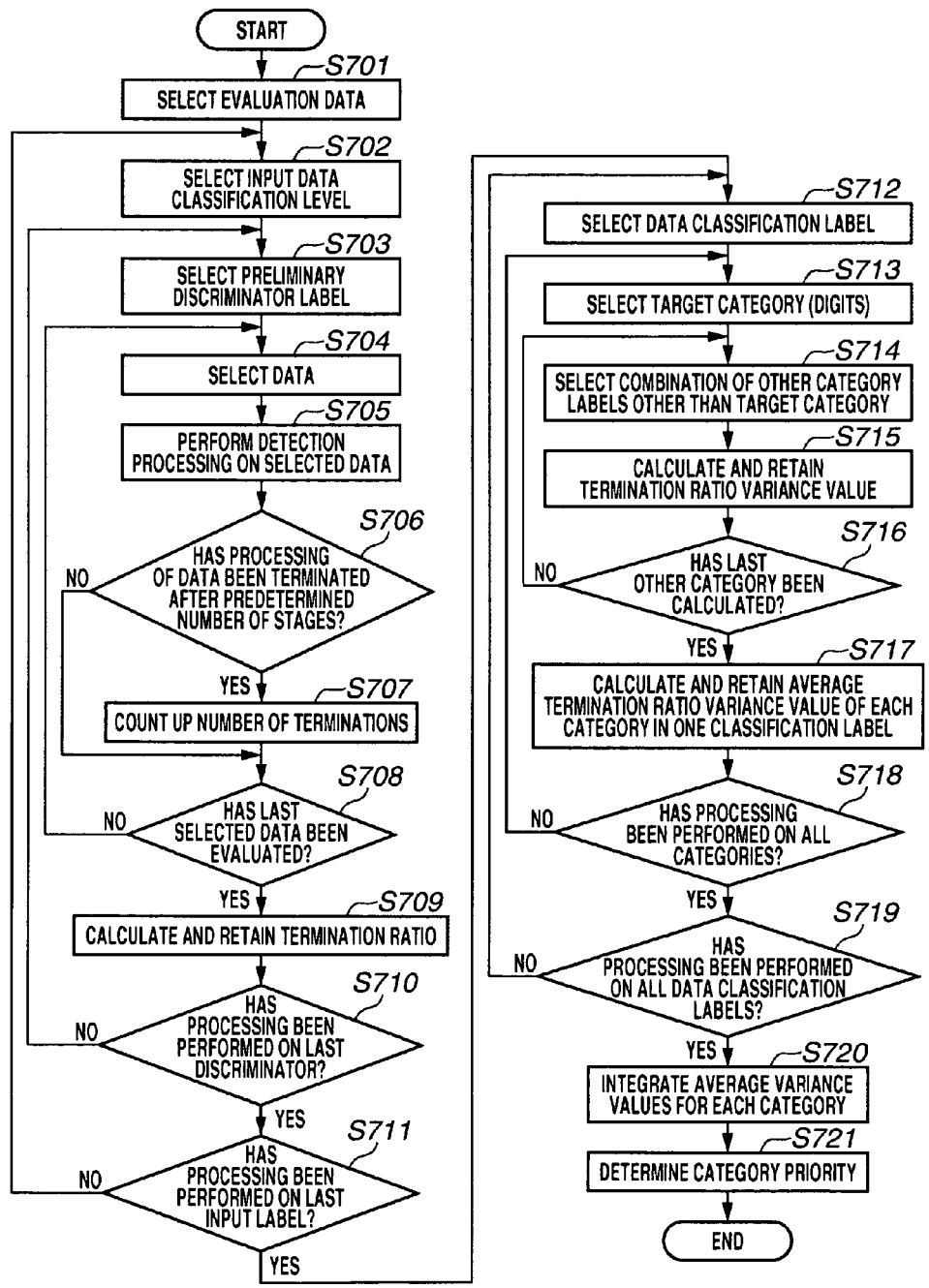
FIG. 14 illustrates preliminary discriminator evaluation processing according to the first exemplary embodiment.

FIG. 14 illustrates preliminary discriminator evaluation processing in step S103 according to the present exemplary embodiment. The processing will be described in detail below with reference to FIG. 14.

In step S701, the CPU 208 selects the detection target data (face image data) to be used in the evaluation from among the data stored in the high-capacity storage unit 211. These face image data is classified according to the combination of variation categories as described above. The CPU 208 selects the detection target data such that all of the combinations can be constantly classified. The non-detection target data (non-face data) is not used for the evaluation processing.

In loop processing in steps S702, S703, S704, S705, S706, S707, S708, S709, S710, and S711, the CPU 208 processes the evaluation data to be input for each classification label. In step S702, the CPU 208 selects the data classification label, for example, "aA1" in the classification illustrated in FIG. 7.

In the loop processing in steps S703, S704, S705, S706, S707, S708, S709, and S710, the CPU 208 enables the preliminary discriminator to perform the processing for each classification label. The discriminator having the label "aA1" refers to the discriminator which has learnt to have the label "aA1" as the detection target. In step S703, the CPU 208 selects one discriminator label. There exists one preliminary discriminator corresponding to one discriminator label, which is equivalent to selecting one preliminary discriminator.

In step S704, the CPU 208 selects one set of the data belonging to the classification indicated by the data classification label selected in step S702 from among the evaluation data selected in step S701. In step S705, the CPU 208 inputs the selected data into the preliminary discriminator having the label selected in step S703, and performs the detection processing.

Each preliminary discriminator is generated up to a predetermined stage as described above. In step S706, the CPU 208 determines whether the input data remains up to the predetermined stage without being terminated. When the data is terminated (YES in step S706), then in step S707, the CPU 208 counts the number of terminations performed by the discriminator. At the head of the loop in step S703, the number of terminations is initialized to "0".

In step S708, the CPU 208 determines whether all of the evaluation data belonging to the data classification selected in step S702 is evaluated. When all of the evaluation data has not been processed (NO in step S708), the CPU 208 returns the processing to step S704 to select following data.

When all of the data belonging to the data classification is evaluated (YES in step S708), then in step S709, the CPU 208 calculates the termination ratio and retains the calculated value in the RAM 210.

In step S710, the CPU 208 confirms whether the loop processing is completed on all of the preliminary discriminators. When not completed (NO in step S710), the CPU 208 returns the processing to step S703 to select a following preliminary discriminator.

In step S711, similarly, the CPU 208 confirms whether processing of all of the input data classification labels has been completed. When not completed (NO in step S711), the CPU 208 returns the processing to step S702 to select a following data classification label. By the processing described above, a list of each termination ratio according to the combination of the input data classification labels and the detection-processed discriminator labels is established in the RAM 210 as illustrated in FIG. 15.

Figure 16:
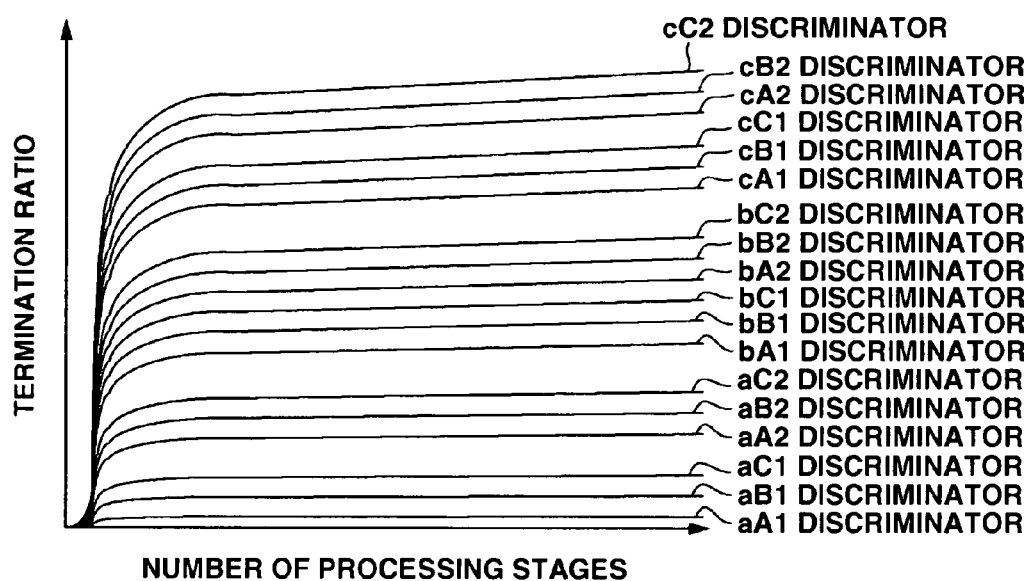
FIG. 16 illustrates transition of the termination ratios of preliminary discriminators when specified variation data is input.

When groups of the detection target data belonging to the combination of certain variation categories are input to all of the preliminary discriminators, the termination ratio of each discriminator transits as the processing stage goes by, for example, as illustrated in FIG. 16. FIG. 16 illustrates the data groups of the classification label "aA1" which are input. Since the data groups of the classification label "aA1" is input in the example of FIG. 16, the termination ratio performed by the preliminary discriminator "aA1" having a detection target of the variation has the lowest termination ratio.

Other discriminators have higher termination ratios than that of the preliminary discriminator "aA1". A difference among the categories (i.e., a digit position of the label) causes a different tendency of the termination ratio. For example, the labels of the categories (ii) and (iii) are fixed to "A1", and only the category (i) has a different label. When the category (i) has a label "c", the termination ratio is highest. When the category (i) has a label "b", the termination ratio is middle. When the labels of the categories (i) and (ii) are fixed to "aA", a difference between the termination ratios of the labels "1" and "2" of the category (iii) is not very large.

The category having a large change of the termination ratio is considered to have a large change between the classifications, and thus be easily differentiated by the discriminator (thus, easily terminated at an early point when other classification is performed). Therefore, in the main discriminator having the branch structure to be established in the main learning, the category having a large variation of the termination ratio is branched at an earlier stage to improve the processing speed and the detection accuracy.

According to the present exemplary embodiment, based on the idea as describe above, the priority order for branching is determined. As illustrated in FIG. 16, since the termination ratio of each discriminator does not change very greatly in the processing stages higher than a certain degree, the CPU 208 checks the variance of the termination ratios in a predetermined stage (i.e., a table in FIG. 15) and then determines the priority order.

In the loop processing in steps S712, S713, S714, S715, S716, S717, S718, and S719, the CPU 208 calculates an average value of the variance of the termination ratios in each variation category of each input data classification label (each one vertical column in a table illustrated in FIG. 15). In step S712, the CPU 208 selects one classification label (one column in the table). In step S713, the CPU 208 selects a target category (i.e., digits of the label having three digits). An example will be described below in which the category (i) is set to be the target category.

In step S714, the CPU 208 selects one combination of the labels of other categories which are not the target category. When the category (i) is the target category, the other categories are (ii) and (iii). Thus, the combination of the labels is, for example, "A1".

In step S715, when the CPU 208 changes only the target category and fixes the other category labels, the variance of the termination ratio is calculated by using equation (10).

$$\sigma^2_{KL'L''} = \frac{\sum_{l \in K}(\bar{x}_{L'L''})^2}{n_K} \quad (10)$$

Equation (10) includes a target category "K" having a label "1", the number of classifications of the target category "$n_k$", selected fixed labels "L'L''" of two other categories, the termination ratio of the label "$x_{1L'L''}$", and an average of the termination ratio "$\bar{x}_{L'L''}$". In the descriptions above, equation (10) is equivalent to processing for calculating the variance of three values of the preliminary discriminator levels "aA1", "bA1", and "cA1" in the "aA1" column of the data classification label illustrated in FIG. 15.

The CPU 208 returns the process from step S716 to step S714 to similarly calculate the variance values of all combinations with the other category labels "L'L''". In step S716, the CPU 208 determines whether the variance values of all combinations with the other category labels are calculated.

When all of the variance values of the target category is calculated (YES in step S716), the CPU 208 calculates an average value of the variance values in step S717. As described above, an average variance value of the termination ratios relative to the target category can be acquired.

In step S718, the CPU 208 determines whether the loop processing from step S713 to step S718 is performed on the selected data classification labels of all categories.

In step S719, the CPU 208 determines whether the similar processing is completed on all of the data classification labels. When the processing is not completed (NO in step S719), the processing returns to step S712.

In step S720, the variance value for each data classification label can be acquired for each category. In step S720, the CPU 208 integrates the variance values of all of the data classification labels, and calculates an integrated value for each category. The integration processing may be a simple addition or may acquire an average value by dividing by the number of data classifications.

In step S721, the CPU 208 compares the integrated values for categories to each other and determines a category priority level. The CPU 208 determines that the larger integrated value the category has, the higher priority the category has.

Figure 17:
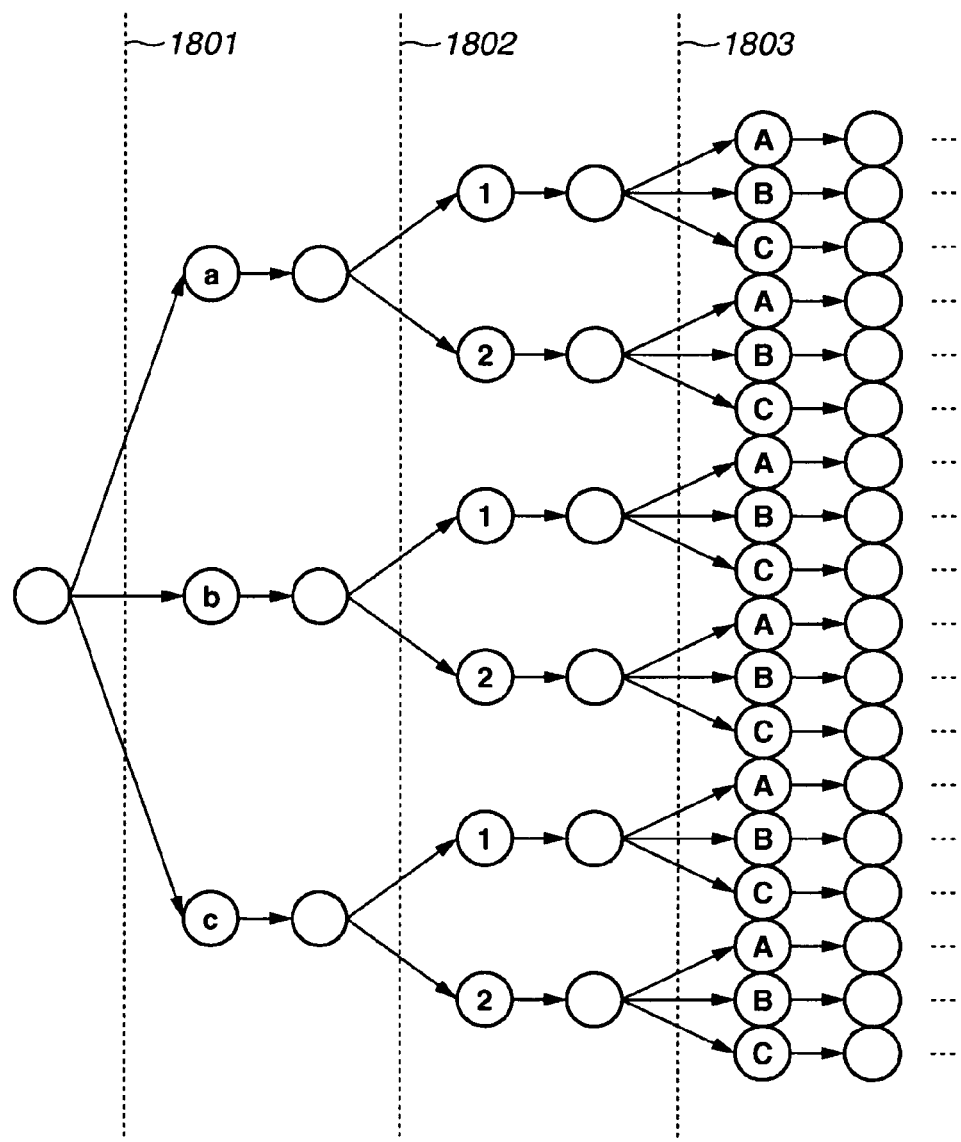
FIG. 17 illustrates a branch structure determined based on a list of the termination ratios.

By the processing described above, the CPU 208 determines the branch structure (branch structure determination) in which a corresponding number of branches to a number of classifications are sequentially generated from the category having a higher priority. FIG. 17 illustrates an example of the branch structure determined by the termination ratio list illustrated in FIG. 15. In FIG. 17, the label illustrated in the node in each first stage after being branched indicates the classification of the variation of the detection target data which the branch processes.

For example, a path to become a branch at the top in FIG. 17 is a branch for detecting the classification data "aA1". The number of processing nodes before being branched is experimentally determined in the present exemplary embodiment. However, the number thereof may not be fixed herein and may be determined based on the summed scores or the error ratios having a weight in the main learning described below.

Referring back to FIG. 11, the CPU 208 learns the main discriminator having the branch structure in step S104 based on the branch structure determined in step S103. The main learning processing is basically similar to the preliminary learning described above. However, it is different in that the discriminator is copied and the detection target data is divided at each branch position.

For example, in FIG. 17, since the nodes up to a first branch position 1801 process all of data including as the detection target all of variations targeted by the main discriminator, the CPU 208 uses all of the selected learning data for the learning. That is, the data of all of the category variations is considered to be correct answer data.

After the first branch position 1801, the category (i) is branched into three. The CPU 208 makes three copies of a processing state of the nodes (error ratios having a weight etc.) up to the first branch position 1801, further classifies only the category (i) of the learning detection target data and divides the data into three, and uses the data as the detection target data for learning the branch. For example, the face image of the label "a**" (*: arbitrary) is used only for learning the top branch having the label "a". The CPU 208 uses the data common among all of the branches as the non-detection target data.

Similarly, the CPU 208 enables the nodes after a second branch position 1802 to make two copies of the processing results of all nodes and to use only data having the labels "*1*" and "*2*" in the detection target data used by each node in a previous stage as the detection target data.

No more branches are generated after the third branch position 1803. The CPU 208 learns some hundreds of nodes in each one branch which can generate a sufficient detection performance and then completes the processing.

By the above-described processing, the main discriminator having the branch structure can be generated. The main discriminator can perform the processing at high speed, since the main discriminator terminates the detection target data which is not to be processed by the main discriminator at an early point. Further, since the detection target data to be processed by the main discriminator has the low robustness, the main discriminator can detect the detection target data in a small number of node stages with high accuracy.

A learning time is generally increased according to the number of pieces of input learning data. In order for each of branches to exert a sufficient performance, a sufficient amount of detection target data needs to be input. If the data including all of the detection target data is to be learnt before the branch is generated, an enormous length of learning time is necessary.

Thus, a sub-set data may be used for the learning before the branch is generated, and the learning data may be added so that almost full-set data for each branch is learnt as the branch is advanced. In this case, every time the learning data is input, the weight added to each learning data described in the learning processing needs to be updated and re-normalized.

In the first exemplary embodiment, the method for determining the category priority level is described using the variance of the termination ratios. In a second exemplary embodiment of the present invention, a method which uses a difference of the summed sores (entire reliability level) will be described.

The present exemplary embodiment will describe only a difference from the first exemplary embodiment. A flow of the processing of the entire learning up to the generation of the main discriminator is similar to that of the first exemplary embodiment illustrated in FIG. 11. According to the present exemplary embodiment, evaluation processing is performed by the preliminary discriminator in step S103 as illustrated in FIG. 18.

In FIG. 18, the processing in steps S1601, S1602, S1603, S1604, and S1605 is performed similar to that having the same last two digits of steps S701, S702, S703, S704, and S705 in FIG. 14.

According to the present exemplary embodiment, instead of steps S706 and S707, processing in step S1606 is performed. This processing adds up the summed score values (entire reliability levels) of the selected data when the detection processing is performed up to a predetermined stage and retains the added value in a predetermined storage region of the RAM 210. The storage region is initialized at the head (step S1603) of the loop. When the processing is terminated without reaching the predetermined stage, the summed score value is determined as a minimum value, for example, "0".

The next step S1607 has the same processing as that of step S708. In step S1608, the CPU 208 acquires a total value of the summed score values (entire reliability levels) of the data of each selected data classification label in the selected preliminary discriminator. The CPU 208 divides the total value by the number of data groups, and calculates the average value, and stores the average value in a predetermined region of the RAM 210.

Steps S1609 and S1610 have the same processing as that of steps S710 and S711. When step S1610 is completed, as a result, a list of the summed score values equivalent to a list of the termination ratio illustrated in FIG. 15 is completed in the predetermined region of the RAM 210.

Figure 19A:
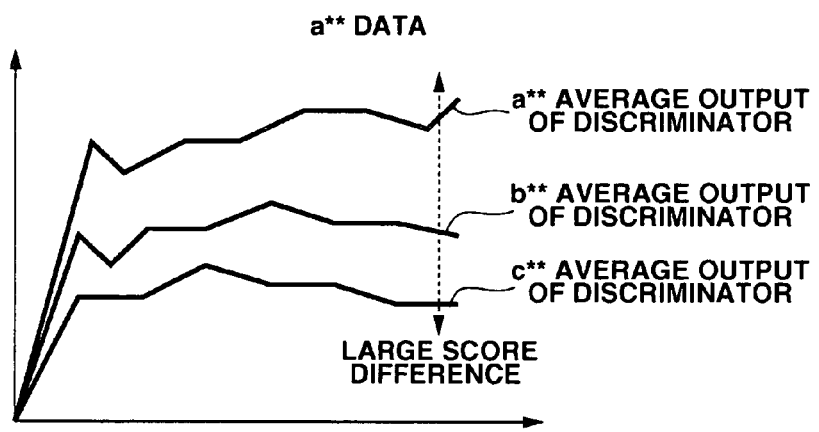
FIGS. 19A and 19B illustrate an example of transitions of summed scores calculated by a group of the discriminators for each category label.

If the detection target data is input, the summed score is stored as the processing stage is advanced. The discriminator having the detection target data highly matching with the category variation has a higher value. For example, FIG. 19A illustrates transitions of average summed scores when the data group having the label "a" of the category (i) variation are input to each of the preliminary discriminators belonging to "a", "b", "c" ("" indicates all combinations of the other categories). As illustrated in FIG. 19A, the preliminary discriminator belonging to the "a**" which matches with the category variation of the data group outputs the higher summed scores compared to other discriminators.

Figure 19B:
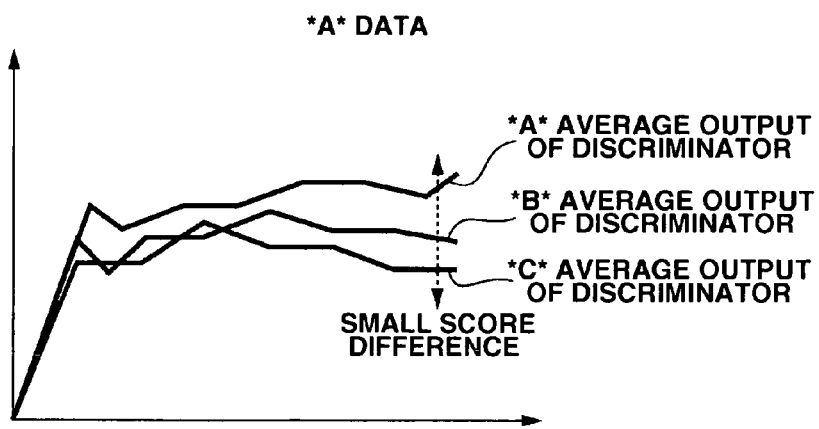

Similarly, FIG. 19B illustrates transition of the average summed scores when the data group having the label of "A" of the category (ii) variation are input to each of the preliminary discriminators. Similarly to FIG. 19A, as illustrated in FIG. 19B, the preliminary discriminator of "*A*" outputs the higher summed score values than those of the other discriminators. However, a difference of the summed score from that of the other discriminators is smaller than that of FIG. 19A.

In a certain category, a large difference among the summed scores means a large difference among the classifications of the categories. Since the large difference decreases possibilities of erroneous determination, the branches can be terminated at an early point according to the lower summed scores. Therefore, the CPU 208 can determine the priority level for branching the category by using the difference among the average summed scores of each category.

In the loop processing in steps S1611, S1612, S1613, S1614, S1615, S1616, S1617, S1618, S1619, S1620, S1621, and S1622, the CPU 208 calculates the difference among the average summed scores of each category.

In step S1611, the CPU 208 determines the target category (e.g., (i)). In step S1612, the CPU 208 selects the data label (e.g., "a") to be processed for the target category. Similarly, in step S1613, the CPU 208 selects the label (e.g., "b") of the preliminary discriminator.

In step S1614, the CPU 208 selects the discriminator label and the data labels of the other categories which are not the target category. In step S1615, the CPU 208 acquires average values of the summed scores each corresponding to a combination of the selected data and the discriminator label from a table region of the RAM 210 retained in step S1608, and adds up the average values. The region for retaining the added value is initialized in step S1613.

In step S1616, the CPU 208 confirms whether the processing for combining all of data of the other categories and all of discriminators is completed. When not completed (NO in step S1616), the processing returns to step S1614 to similarly perform processing for combining a following discriminator and following labels. As described above, in step S1617, a total of the average summed scores regarding the combinations (e.g., data "a" and discriminator "b") of the discriminator label and a certain data label of the target category can be acquired. The CPU 208 acquires the average summed score value for each combination of the target category acquired by dividing the total of the average summed scores by the number of combinations of the other categories.

In step S1618, the CPU 208 confirms whether the processing is completed on all of the discriminator labels of the target category. When not completed (NO in step S1618), the processing is repeated from step S1613.

In step S1619, the average summed score value for each combination of the target category corresponding to all of combinations of the data labels having the target category and the discriminator labels is calculated. Thus, the CPU 208 calculates the difference among the summed scores and the average value thereof. For example, in FIG. 19A, when each summed score value is defined as "$S_a$", "$S_b$", and "$S_c$" in each predetermined stage "a", "b", and "c", the CPU 208 defines the following equation (11) as a difference value among the summed scores corresponding to the data label "a".

$$D_a = \frac{|S_a - S_b| + |S_a - S_c| + |S_b - S_c|}{3} \quad (11)$$

The loop processing in steps S1611, S1612, S1613, S1614, S1615, S1616, S1617, S1618, S1619, and S1620 similarly calculates the difference value among the summed scores of other data labels ("b" and "c" in the present exemplary embodiment) than that of the target category.

In step S1621, the CPU 208 further calculates the average value of the difference values of the summed scores. An acquired value is the average difference value among the summed scores for each category.

When the loop processing in steps S1611, S1612, S1613, S1614, S1615, S1616, S1617, S1618, S1619, S1620, S1621, and S1622 are completed, the average difference value of the summed scores is calculated for each of the categories (i), (ii), and (iii). In step S1623, the CPU 208 determines the priority level for branching the category based on the average difference value of the summed scores. When the category has the larger score difference, the category has the higher priority level to be branched. The processing described above can also determine the branch structure equivalent to that illustrated in FIG. 17.

The learning processing of the main discriminator hereafter is performed similar to that of the first exemplary embodiment.

According to the present exemplary embodiment as described above, the summed score value when the evaluation data is input to the preliminary discriminator in the stage of a predetermined number is used to determine the priority order for branching. It is also possible to use both of the evaluation by the termination ratio of the first exemplary embodiment and the evaluation by the difference among the summed scores of the present exemplary embodiment, thereby realizing a method for determining the branch structure having higher accuracy.

According to the first and second exemplary embodiments, the order for branching is determined by the above-described evaluation method, and then the main learning processing including the number of processing node stages until the branch is generated is performed as a predetermined number of processing node stages. Further, it is also possible to determine the number of processing node stages until the branch is generated while the main learning processing is being performed.

For example, in the branch structure illustrated in FIG. 17, the CPU 208 may determine the number of processing node stages in a non-branch state before the first branch position 1801 based on the termination ratio of the non-detection target data. Before the branch is generated, since only one discriminator is operated, the processing can be performed at especially high speed. If, after the termination processing data is decreased, 60% or more of non-face data is to be branched before the first branch is generated, the CPU 208 may perform the learning to calculate a ratio for terminating the non-face data while performing the learning for each one stage. When 60% or more of non-face data remains, the first branch may be generated. Similarly, the CPU 208 may determine the number of processing stages while referring to the summed scores and the difference among the summed scores.

Further, the preliminary learning is performed only once according to the above-described exemplary embodiment, but may be also performed while learning the branch. Referring to FIG. 17, the CPU 208 defines as the first branch position 1801 the category having the highest priority level as described above, and determines which category is to be the second branch position 1802 while performing the preliminary learning again. At this point, the CPU 208 learns a preliminary discriminator having three discriminators at the first branch, each of which has six combinations of the other categories (ii) and (iii), and can determine a following branch similar to the first and second exemplary embodiments.

The exemplary embodiments describe a case in which the processing is performed on the image data, and can be further applied to a case in which a specified pattern is extracted from one-dimensional data, such as audio data, and multi-dimensional data.

The exemplary embodiments describe a case in which the rectangular filter is used as a weak discriminator, and can be further applied to other various weak discriminators.

The exemplary embodiments describe a case in which the exemplary embodiment is applied to the discriminator performed by the boosting algorithm, and may be further applied to other discriminators having the branch structure as a method for determining the branch structure.

Further, the exemplary embodiments describe a case in which the discrimination processing unit 203 is realized by the hardware, and can be further applied to a case in which the discrimination processing unit 203 is realized by the software by using a digital signal processor (DSP). Even for that case, a processing speed and detection accuracy can be improved by selecting the appropriate branch structure.

A function described in the above-described exemplary embodiments can be adopted as an apparatus exclusive for the learning and software for a general computer.

In the preliminary learning processing and the main learning processing, samples of a plurality of discrimination target patterns classified according to a plurality of combinations of variation categories may be used as teaching data of the correct answer or the incorrect answer. Samples of a plurality of non-discrimination target patterns may be used as the teaching data of the incorrect answer.

In the preliminary learning processing, samples of a plurality of discrimination target patterns classified according to a plurality of combinations of variation categories corresponding to each preliminary discriminator may be used as teaching data of the correct answer.

In the preliminary learning processing, samples of a plurality of discrimination target patterns classified according to a plurality of combinations of variation categories corresponding to each preliminary discriminator may be used as a part of teaching data of the incorrect answer.

According to each exemplary embodiment as described above, when the discriminator having the branch structure is learnt, the appropriate branch structure can be established without increasing the processing time.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-004975 filed Jan. 13, 2009, which is hereby incorporated by reference herein in its entirety.

What is claimed is:

1. An information processing apparatus comprising:
a processor and memory;
a preliminary learning unit configured to make a plurality of preliminary discriminators perform learning, each of the preliminary discriminators includes cascade-connected weak discriminators with no branches and learns to discriminate a corresponding one of combinations of variation ranges for a plurality of variation categories which do not depend on each other;
an evaluation unit configured to obtain discrimination results of the plurality of preliminary discriminators learned by the preliminary learning unit, by inputting, samples classified according to the combinations of variation ranges for the plurality of variation categories, to the preliminary discriminators so as to perform the discrimination processing on the samples using respective preliminary discriminators and evaluate discrimination ability of the variation categories based on discrimination results of the plurality of preliminary discriminators;
a determination unit configured to determine an order of discriminating the variation categories in a main discriminator according to a descending order of the discrimination ability of the variation categories;
a main discriminator generation unit configured to generate a main discriminator which has a branch structure of multiple layers by setting each of the multiple layers to discriminate a variation in respective one of the plurality of variation categories, so that variations in the plurality of variation categories should be discriminated in the determined order of discriminating the variation categories; and
a main learning unit configured to make the main discriminator perform learning.

2. The information processing apparatus according to claim 1, wherein the preliminary discriminator performs the discrimination processing step by step, and terminates the processing when determining the pattern not to be a discrimination target pattern, and
wherein the determination unit determines the order of discriminating the variation categories to be discriminated based on a ratio of termination when the evaluation data classified according to the combinations of variation ranges for variation categories is input to each preliminary discriminator.

3. The information apparatus according to claim 1, wherein the preliminary discriminator outputs a reliability level with respect to a discrimination target pattern, and
wherein the determination unit determines the order of discriminating the variation categories based on the reliability level when the evaluation data classified according to the combinations of variation ranges for variation categories is input to each preliminary discriminator.

4. The information processing apparatus according to claim 3, wherein the determination unit increases a priority level of a variation category having a largest difference of the reliability levels when the evaluation data classified according to each variation category is input, and then determines the order of discriminating the variation categories according to the priority level.

5. An information processing method comprising:
making a plurality of preliminary discriminators perform learning, each of the preliminary discriminators includes cascade-connected weak discriminators with no branches and learns to discriminate a corresponding one of combinations of variation ranges for a plurality of variation categories which do not depend on each other;
obtaining discrimination results of the plurality of preliminary discriminators which have been learned, by inputting, samples classified according to the combinations of variation ranges for the plurality of variation categories, to the preliminary discriminators so as to perform the discrimination processing on the samples using respective preliminary discriminators and evaluate discrimination ability of the variation categories based on discrimination results of the plurality of preliminary discriminators;
determining an order of discriminating the variation categories in a main discriminator according to a descending order of the discrimination ability of the variation categories;

generating a main discriminator which has a branch structure of multiple layers by setting each of the multiple layers to discriminate a variation in respective one of the plurality of variation categories, so that variations in the plurality of variation categories should be discriminated in the determined order of discriminating the variation categories; and making the main discriminator perform learning.

6. The information processing method according to claim 5, wherein the deciding of the branch structure of the main discriminator comprises:

inputting samples of a plurality of discrimination target patterns classified according to the combinations of variation ranges for variation categories to the preliminary discriminator as evaluation data;

executing the discrimination processing; and deciding the branching order for the variation categories based on a result of the discrimination processing.

7. The information processing method according to claim 6, wherein the preliminary discriminator performs the discrimination processing step by step, and terminates the processing when determining the evaluation data not to be a discrimination target pattern, and wherein the determining of the order of the variation categories to be discriminated is performed based on a ratio of termination when the evaluation data classified according to the combinations of labels for variation categories is input to each preliminary discriminator.

8. The information processing method according to claim 6, wherein the preliminary discriminator outputs a reliability level of a discrimination target pattern, and wherein the deciding of the branching order for the variation categories is performed based on the reliability level when the evaluation data classified according to the combinations of variation ranges for variation categories is input to each preliminary discriminator.

9. The information processing method according to claim 8, wherein the deciding of the branching order for the variation categories includes increasing a priority level of a variation category having a largest difference of the reliability levels when the evaluation data classified according to each variation category is input, and then determining an order for branching according to the priority level.

10. A non-transitory computer-readable storage medium storing a program for causing a computer to execute a method comprising:

making a plurality of preliminary discriminators perform learning, each of the preliminary discriminators includes cascade-connected weak discriminators with no branches and learns to discriminate a corresponding one of combinations of variation ranges for a plurality of variation categories which do not depend on each other;

obtaining discrimination results of the plurality of preliminary discriminators which have been learned, by inputting, samples classified according to the combinations of variation ranges for the plurality of variation categories, to the preliminary discriminators so as to perform the discrimination processing on the samples using respective preliminary discriminators and evaluate discrimination ability of the variation categories based on discrimination results of the plurality of preliminary discriminators;

determining an order of discriminating the variation categories in a main discriminator according to a descending order of the discrimination ability of the variation categories;

generating a main discriminator which has a branch structure of multiple layers by setting each of the multiple layers to discriminate a variation in respective one of the plurality of variation categories, so that variations in the plurality of variation categories should be discriminated in the determined order of discriminating the variation categories; and making the main discriminator perform learning.

11. An object detection apparatus comprising:

a first processor and a first memory;

an input unit configured to input an image; and a detection unit configured to detect an object from the input image using a main discriminator, wherein the main discriminator is generated by an information processing apparatus which comprises:

a second processor and a second memory;

a preliminary learning unit configured to make a plurality of preliminary discriminators perform learning, each of the preliminary discriminators includes cascade-connected weak discriminators with no branches and learns to discriminate a corresponding one of combinations of variation ranges for a plurality of variation categories which do not depend on each other;

an evaluation unit configured to obtain discrimination results of the plurality of preliminary discriminators learned by the preliminary learning unit, by inputting, samples classified according to the combinations of variation ranges for the plurality of variation categories, to the preliminary discriminators so as to perform the discrimination processing on the samples using respective preliminary discriminators and evaluate discrimination ability of the variation categories based on discrimination results of the plurality of preliminary discriminators;

a determination unit configured to determine an order of discriminating the variation categories in a main discriminator according to a descending order of the discrimination ability of the variation categories;

a main discriminator generation unit configured to generate a main discriminator which has a branch structure of multiple layers by setting each of the multiple layers to discriminate a variation in respective one of the plurality of variation categories, so that variations in the plurality of variation categories should be discriminated in the determined order of discriminating the variation categories; and a main learning unit configured to make the main discriminator perform learning.

12. An object detection method comprising:

inputting an image; and detecting an object from the input image using a main discriminator, wherein the main discriminator is generated by an information processing method which comprises:

making a plurality of preliminary discriminators perform learning, each of the preliminary discriminators includes cascade-connected weak discriminators with no branches and learns to discriminate a corresponding one of combinations of variation ranges for a plurality of variation categories which do not depend on each other;

obtaining discrimination results of the plurality of preliminary discriminators which have been learned, by inputting, samples classified according to the combinations of variation ranges for the plurality of variation categories, to the preliminary discriminators so as to perform the discrimination processing on the samples using respective preliminary discriminators and evaluate discrimination ability of the variation categories based on discrimination results of the plurality of preliminary discriminators;

determining an order of discriminating the variation categories in a main discriminator according to a descending order of the discrimination ability of the variation categories;

generating a main discriminator which has a branch structure of multiple layers by setting each of the multiple layers to discriminate a variation in respective one of the plurality of variation categories, so that variations in the plurality of variation categories should be discriminated in the determined order of discriminating the variation categories; and making the main discriminator perform learning.

* * * * *